US012529977B2

(12) United States Patent
Fujino et al.

(10) Patent No.: US 12,529,977 B2
(45) Date of Patent: Jan. 20, 2026

(54) IMAGE FORMING APPARATUS AND PROCESS CARTRIDGE

(71) Applicant: CANON KABUSHIKI KAISHA, Tokyo (JP)

(72) Inventors: Hirokazu Fujino, Shizuoka (JP); Motonari Ito, Shizuoka (JP); Naoki Fukushima, Shizuoka (JP); Masahiro Kurachi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/735,919

(22) Filed: Jun. 6, 2024

(65) Prior Publication Data

US 2024/0427260 A1 Dec. 26, 2024

(30) Foreign Application Priority Data

Jun. 20, 2023 (JP) ................................. 2023-101284

(51) Int. Cl.
*G03G 15/00* (2006.01)
*G03G 15/02* (2006.01)
*G03G 15/08* (2006.01)

(52) U.S. Cl.
CPC ..... *G03G 15/0225* (2013.01); *G03G 15/0233* (2013.01); *G03G 15/0875* (2013.01)

(58) Field of Classification Search
CPC ........... G03G 15/0225; G03G 15/0233; G03G 15/0875
See application file for complete search history.

(56) References Cited

U.S. PATENT DOCUMENTS 6,555,210 B1 4/2003 Masuda et al.
7,933,533 B2 4/2011 Higaki
(Continued)

FOREIGN PATENT DOCUMENTS

JP 2-272594 A 11/1990
JP 11-295967 A 10/1999
(Continued)

OTHER PUBLICATIONS

Extended European Search Report in European Application No. 24182756.7 (Nov. 2024).
(Continued)

*Primary Examiner* — Sophia S Chen
(74) *Attorney, Agent, or Firm* — VENABLE LLP

(57) ABSTRACT

An image forming apparatus includes an image bearing member, a charging roller, a cleaning roller and a developing member. The charging roller is provided with a surface contacting a surface of the image bearing member and charges the surface of the image bearing member. The cleaning roller is provided with an elastic foam layer contacting the surface of the charging roller cleans the surface of the charging roller. A storage elastic modulus of the surface of the charging roller measured in a measuring environment of 23° C., 50% RH and a measuring frequency of 10 Hz is defined as E'C and a storage elastic modulus of the elastic foam layer of the cleaning roller is defined as E'CC. The storage elastic modulus E'C of the surface of the charging roller and the storage elastic modulus E'CC of the elastic foam layer of the cleaning roller satisfy E'C>E'CC.

18 Claims, 13 Drawing Sheets

(56) References Cited

U.S. PATENT DOCUMENTS

| | | | |
|---|---|---|---|
| 9,465,322 B2 | 10/2016 | Matsukawa et al. | |
| 11,169,454 B2 | 11/2021 | Nishioka et al. | |
| 11,347,156 B2 | 5/2022 | Kurachi et al. | |
| 11,360,405 B2 | 6/2022 | Tomono et al. | |
| 11,809,126 B2 | 11/2023 | Kinuta et al. | |
| 2011/0236052 A1 | 9/2011 | Takagi et al. | |
| 2016/0026118 A1 | 1/2016 | Matsukawa et al. | |
| 2021/0116829 A1 | 4/2021 | Tomono et al. | |
| 2024/0045352 A1* | 2/2024 | Morimoto .......... | G03G 15/0233 |

FOREIGN PATENT DOCUMENTS

| | | |
|---|---|---|
| JP | 2007-121545 A | 5/2007 |
| JP | 2008-122915 A | 5/2008 |
| JP | 2009-197868 A | 9/2009 |
| JP | 2013-61546 A | 4/2013 |
| JP | 2023-29102 A | 3/2023 |

OTHER PUBLICATIONS

JP 2-272592, [0006], [0008].
JP 2013-61546, [0005], [0007].
JP 11-295967, U.S. Pat. No. 6,555,210 B1.
JP 2008-122915, U.S. Pat. No. 7,933,533 B2.
JP 2023-29102, U.S. Pat. No. 11,809,126 B2.

* cited by examiner

IMAGE FORMING APPARATUS AND PROCESS CARTRIDGE

FIELD OF THE INVENTION AND RELATED ART

The present invention relates to an image forming apparatus such as a copier, a printer, a facsimile machine using an electrophotographic type and an electrostatic recording type, and to a process cartridge mountable to and demountable from a main assembly of the image forming apparatus.

Conventionally, for example, the image forming apparatus, such as the printer using the electrophotographic photosensitive type uniformly charges a surface of a photosensitive member as an image bearing member by a charging means, and selectively expose the charged surface of the photosensitive member by an exposure means to form an electrostatic latent image on the photosensitive member. Then, a toner image is formed on the photosensitive member by supplying toner as developer to the electrostatic latent image on the photosensitive member by a developing means, and this toner image is transferred onto a recording material. In addition, after the toner image is transferred from the photosensitive member to the recording material, the remaining toner on the photosensitive member is removed from the surface of the photosensitive member by a cleaning means before the surface of the photosensitive member is charged again by the charging means.

In such an image forming apparatus, there is a process cartridge type in which the photosensitive member and a process means acting on the photosensitive member are integrated into a cartridge, and the cartridge is configured to be mountable to and demountable from the main assembly of the image forming apparatus. The process means acting on the photosensitive member includes a charging member which charges the photosensitive member, a cleaning member which removes the toner remaining on the photosensitive member, a developing unit (developing device) which develops the electrostatic latent image on the photosensitive member with the toner, etc. By forming a single process cartridge by integrating these process means together with the photosensitive member, and by making it possible for a user to replace the process cartridge at once, improvement of usability is intended.

In addition, there is a process cartridge which employs a contact charging type in which the photosensitive member is charged by a charging roller, which is a charging member, being brought into contact with the photosensitive member. In this case, as a service life of the process cartridge is extended, there is a possibility that the toner or fine particles added to a surface of the toner (hereinafter also referred to as an "external additive") is accumulated on a surface of the charging roller. This is due to a fact that as the process cartridge is used, the toner and the external additives adhered to the photosensitive member gradually slip through the cleaning member. In a case in which the charging roller becomes contaminated due to the accumulation of the toner and the external additives on the surface of the charging roller, it may cause charging defect in the photosensitive member, which may be visualized as uneven density in a halftone image. This charging defect is a problem which occurs later in the service life of the process cartridge, and the charging defect becomes more pronounced as the service life of the process cartridge is longer.

Therefore, it is proposed of a configuration in which a cleaning sheet having flexibility is brought into contact with a charging roller to remove toner and an external additive (hereinafter referred to as "adherent material" or "contamination") which have adhered to the surface of the charging roller in Japanese Patent Application Laid-Open No. 2013-61546. In Japanese Patent Application Laid-Open No. 2013-61546, it is a configuration in which a cleaning blade, which is a cleaning member, is in contact with the photosensitive member, and the adherent material which has slipped through the cleaning blade and the photosensitive member and adhered to the charging roller is removed by bringing the cleaning sheet into contact with the charging roller.

In addition, a configuration in which a cleaning roller is brought into contact with a charging roller is proposed in Japanese Patent Application Laid-Open No. H02-272594. In Japanese Patent Application Laid-Open No. H02-272594, the cleaning roller is rotated so that the cleaning roller and the charging roller have an appropriate difference in peripheral speeds. By this, each portion of a surface of the cleaning roller is uniformly brought into contact with the charging roller to remove contamination of toner and external additives adhered to the charging roller. In addition, sponge material is used for the cleaning roller, and a large amount of foreign matter such as the toner transferred from the charging roller to the sponge material due to rubbing between the cleaning roller and the charging roller is stored in space portions of a porous structure of the sponge material.

However, with the cleaning sheet such as those described in Japanese Patent Application Laid-Open No. 2013-61546, significant removing effect cannot be obtained since the cleaning sheet cannot contact the external additives adhered to recessed portions of the surface of the charging roller. In contrast, even if a brush is used as the cleaning member to be in contact with the charging roller, a fiber diameter of the brush is generally several μm. Therefore, the removing effect can be obtained for the toner having a particle diameter of several μm, however, no significant removing effect still cannot be obtained for the external additives having particle diameters ranging from several nm to several hundred nm. As a result, there is a possibility that image defect of streak-shape is visualized on a halftone image in a portion corresponding to the toner and the external additives adhered to the charging roller.

In addition, in Japanese Patent Application Laid-Open No. H02-272594, with the configuration in which the cleaning roller made of the sponge material is brought into contact with the charging roller, the toner is stored in the space portions of the sponge material, and it is described that it becomes possible to clean the charging roller for a longer period of time. However, in the conventional configuration, it is found that the external additive is made to be adhered tightly to the surface of the charging roller by a cell skeleton of the sponge material, which may cause occurrence of the contamination on the surface of the charging roller. In such a case, there is a possibility that the image defect of streak-shape is visualized on a halftone image in a portion corresponding to the external additives adhered to the charging roller.

In addition, in the conventional configuration, there is a possibility that clogging may occur in the space portions of the porous structure of the sponge material by the toner. In such a case, for example, the cleaning roller may be needed to be replaced with a new one at a predetermined timing, which may complicate maintenance.

SUMMARY OF THE INVENTION

Therefore, an object of the present invention is to make it possible to remove toner and external additives adhered to a charging roller more effectively with a cleaning roller.

The above object is achieved with an image forming apparatus and a process cartridge according to the present invention. In summary, according to an aspect of the present invention, there is provided an image forming apparatus comprising: a rotatable image bearing member; a charging roller provided with a surface contacting a surface of the image bearing member, and configured to be rotated in contact with the rotating image bearing member and to charge the surface of the image bearing member; a cleaning roller provided with an elastic foam layer contacting the surface of the charging roller and configured to be rotated in contact with the rotating charging roller and clean the surface of the charging roller; and a developing member configured to supply a developer to the surface of the image bearing member and form a developer image thereon, wherein a storage elastic modulus of the surface of the charging roller measured in a measuring environment of 23° C., 50% RH and a measuring frequency of 10 Hz is defined as E'C and a storage elastic modulus of the elastic foam layer of the cleaning roller is defined as E'CC measured in the measuring environment and the measuring frequency, and wherein the storage elastic modulus E'C of the surface of the charging roller and the storage elastic modulus E'CC of the elastic foam layer of the cleaning roller satisfy the following relationship $$E'C > E'CC.$$

According to another aspect of the present invention, there is provided a process cartridge mountable to and demountable from a main assembly of an image forming apparatus for forming a developer image by supplying a developer to a surface of a rotatable image bearing member by a developing means and forming an image on a recording material by transferring the developer image onto the recording material, the process cartridge comprising: the rotatable image bearing member; a charging roller provided with a surface contacting a surface of the image bearing member, and configured to be rotated in contact with the rotating image bearing member and to charge the surface of the image bearing member; and a cleaning roller provided with an elastic foam layer contacting the surface of the charging roller and configured to be rotated in contact with the rotating charging roller and clean the surface of the charging roller, wherein a storage elastic modulus of the surface of the charging roller measured in a measuring environment of 23° C., 50% RH and a measuring frequency of 10 Hz is defined as E'C and a storage elastic modulus of the elastic foam layer of the cleaning roller is defined as E'CC measured in the measuring environment and the measuring frequency, and wherein the storage elastic modulus E'C of the surface of the charging roller and the storage elastic modulus E'CC of the elastic foam layer of the cleaning roller satisfy the following relationship $$E'C > E'CC.$$

Further features of the present invention will become apparent from the following description of exemplary embodiments with reference to the attached drawings.

DESCRIPTION OF THE EMBODIMENTS

Hereinafter, an image forming apparatus and a process cartridge according to the present invention will be described in more detail with reference to the drawings.

<Overall Configuration and Operation of an Image Forming Apparatus>

Figure 1:
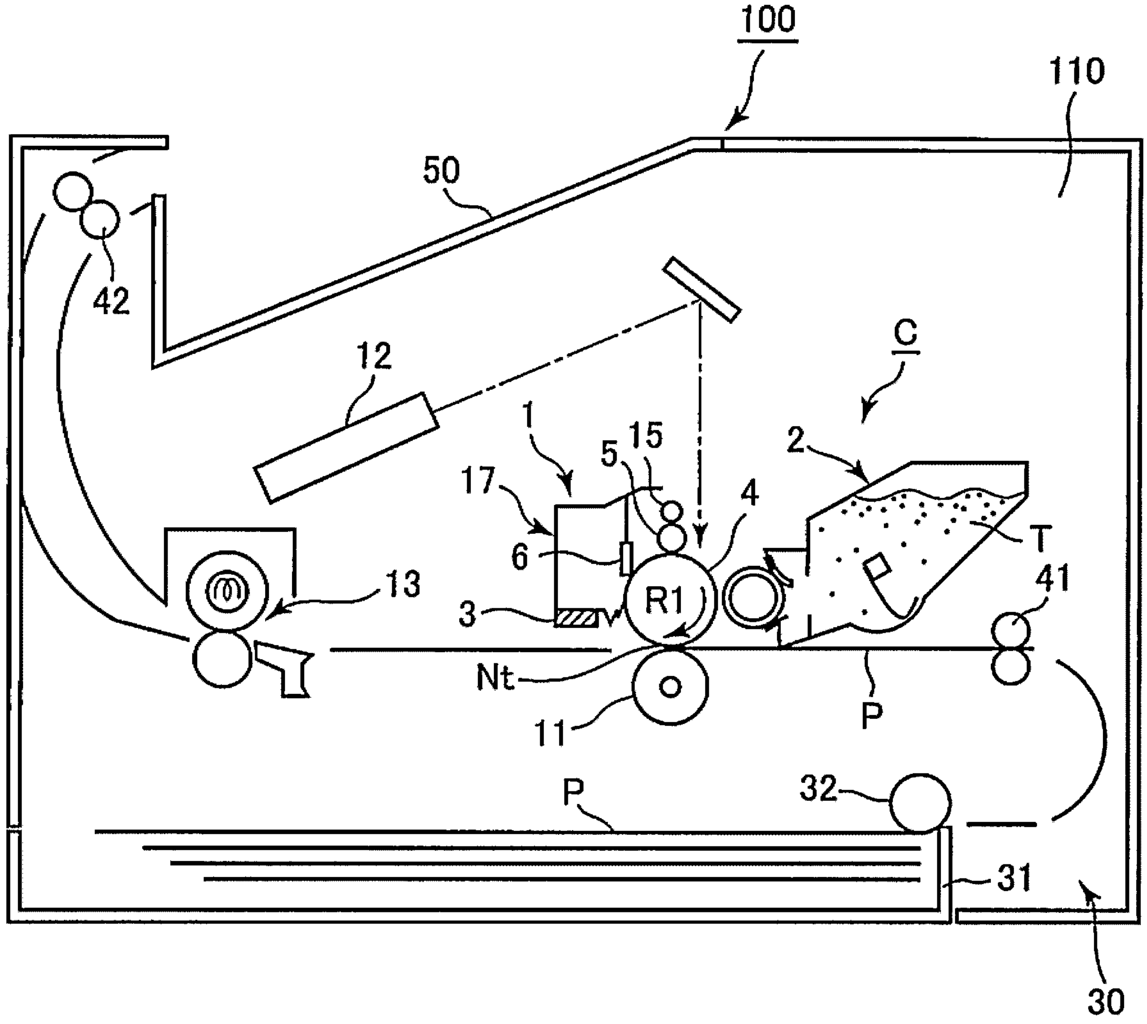
FIG. 1 is a schematic cross-sectional view of an image forming apparatus.

FIG. 1 is a schematic cross-sectional view of an image forming apparatus 100 of the present Embodiment. The image forming apparatus 100 of the present Embodiment is a monochrome laser printer employing a process cartridge type, capable of forming a black monochrome image on a sheet-shaped recording material P using an electrophotographic type.

The image forming apparatus 100 is provided with a photosensitive drum 4, which is a rotatable drum-shaped (cylindrical) photosensitive member (electrophotographic photosensitive member) as an image bearing member. During image formation, the photosensitive drum 4 is rotationally driven at a predetermined process speed (peripheral speed) in a direction of an arrow R1 (clockwise direction) in FIG. 1 by a driving motor (not shown) as a driving source constituting a drive means, which is provided to a main assembly 110. A surface of the rotating photosensitive drum 4 is uniformly charged to predetermined potential of predetermined polarity (negative polarity in the present Embodiment) by a charging roller 5, which is a roller-type charging member as a charging means. The charged surface of the photosensitive drum 4 is scanned and exposed by being irradiated with a laser beam in accordance with image information by an exposure device (laser scanner device) 12 as an exposure means (optical means), and an electrostatic latent image (electrostatic image) is formed on the photosensitive drum 4. The electrostatic latent image formed on the photosensitive drum 4 is developed (visualized) by toner as developer being supplied by a developing device 2 as a developing means, and a toner image (developer image) is formed on the photosensitive drum 4.

In the present Embodiment, onto an exposed portion (image portion) of the photosensitive drum 4 in which absolute value of the potential is lowered by being exposed after uniformly charged, the toner charged to the same polarity (negative polarity in the present Embodiment) as the charging polarity of the photosensitive drum 4 is deposited (reverse development type). In the present Embodiment, normal charging polarity (normal polarity) of the toner, which is a main charging polarity of the toner during the development, is negative polarity.

Opposite to the photosensitive drum 4, a transfer roller 11, which is a roller-type transfer member as a transfer means, is disposed. The transfer roller 11 is pressed toward the photosensitive drum 4 to form a transfer portion (transfer nip) Nt, which is a contacting portion between the photosensitive drum 4 and the transfer roller 11. The toner image formed on the photosensitive drum 4 is transferred in the transfer portion Nt onto the recording material P as a transferred member, which is being nipped and conveyed between the photosensitive drum 4 and the transfer roller 11. To the transfer roller 11, a transfer power source (high voltage power source), which is not shown but provided to the main assembly 110 as a transfer voltage applying means, is connected. During the image formation (during the transfer), to the transfer roller 11, predetermined transfer voltage (transfer bias), which is direct current voltage of reverse polarity (positive polarity in the present Embodiment) to the normal charging polarity of the toner T, is applied by the transfer power source. The recording material (transfer material, recording medium, sheet) P, such as a recording paper, an OHP sheet and cloth, is fed from a feeding portion 30 to the transfer portion Nt. The feeding portion 30 is configured to include a cassette 31 as a recording material accommodating portion, a pickup roller (feeding roller) 32 as a feeding member, a pressure contact member (not shown), which is in pressure contact against the pickup roller 32, etc. The recording material P accommodated in the cassette 31 is separated and fed one by one by the pickup roller 32 and the pressure contact member. The recording material P is conveyed by a registration roller 41 as a conveyance member to the transfer portion Nt with being timed with formation of the toner image on the photosensitive drum 4. The recording material P conveyed by the registration roller 41 is supplied to the transfer portion Nt along a conveyance guide (not shown).

The recording material P, on which the toner image has been transferred, is conveyed to a fixing device 13 as a fixing means along the conveyance guide (not shown). The fixing device 13 is provided with a rotatable fixing member pair constituted by a driving roller and a cylindrical sheet, which incorporates a heater and is rotatably supported by a supporting member. The rotatable fixing member pair applies heat and pressure to the recording material P passing through a fixing portion (fixing nip) formed by the driving roller and the cylindrical sheet to fix (melt, fixedly adhere) the unfixed toner image onto the recording material P. The recording material P, onto which the toner image has been fixed, is conveyed by a discharging roller 42 as a conveyance member, etc., and is discharged (output) onto a tray 50 as a discharging portion provided outside the main assembly 110. Incidentally, in a case in which double-sided image formation (automatic double-sided printing) is performed, the recording material P, onto which the toner image has been fixed on a first side, is conveyed again to the transfer portion Nt by being reversed the conveyance direction and front and back thereof through a reversing conveyance path (not shown). The recording material P is then discharged to the tray 50 after the toner image is transferred and fixed on a second side.

On the other hand, the toner remaining on the photosensitive drum 4 without being transferred to the recording material P during the transfer (transfer remaining toner, residual toner) is removed and collected from the photosensitive drum 4 by a cleaning device 17 as a cleaning means.

In the present Embodiment, the photosensitive drum 4 and the charging roller 5, the developing device 2 and the cleaning device 17, etc., as a process means acting on the photosensitive drum 4, constitute a process cartridge C which is integrally mountable to and demountable from the main assembly 110. The process cartridge C is configured to be easily mountable to and demountable from the main assembly 110 via a mounting means 3, such as mounting guides and positioning members provided to the main assembly 110 and the process cartridge C. Incidentally, the main assembly 110 is a configuration part in the image forming apparatus 100 excluding the process cartridge C.

<Process Cartridge>

Figure 2:
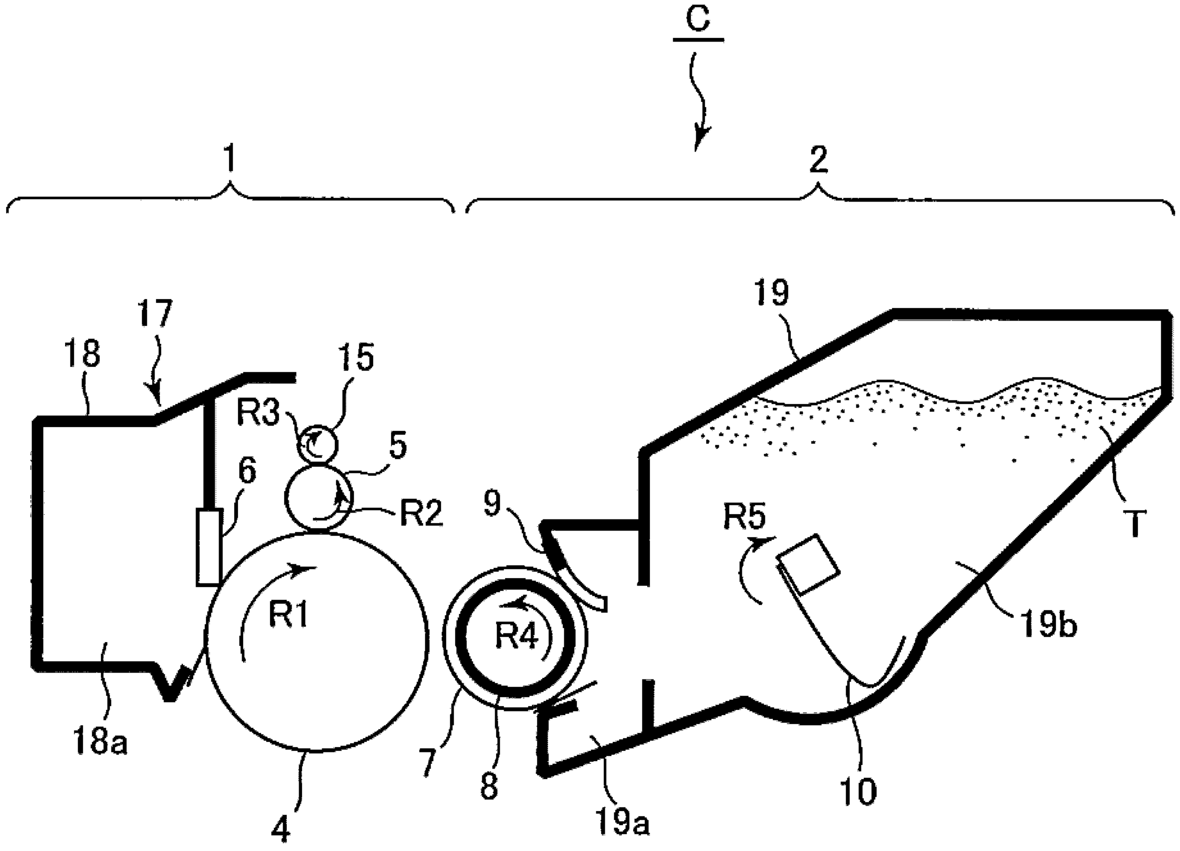
FIG. 2 is a schematic cross-sectional view of a process cartridge.

Next, the process cartridge C in the present Embodiment will be described. FIG. 2 is a schematic cross-sectional view of the process cartridge C in the present Embodiment.

Figure 3:
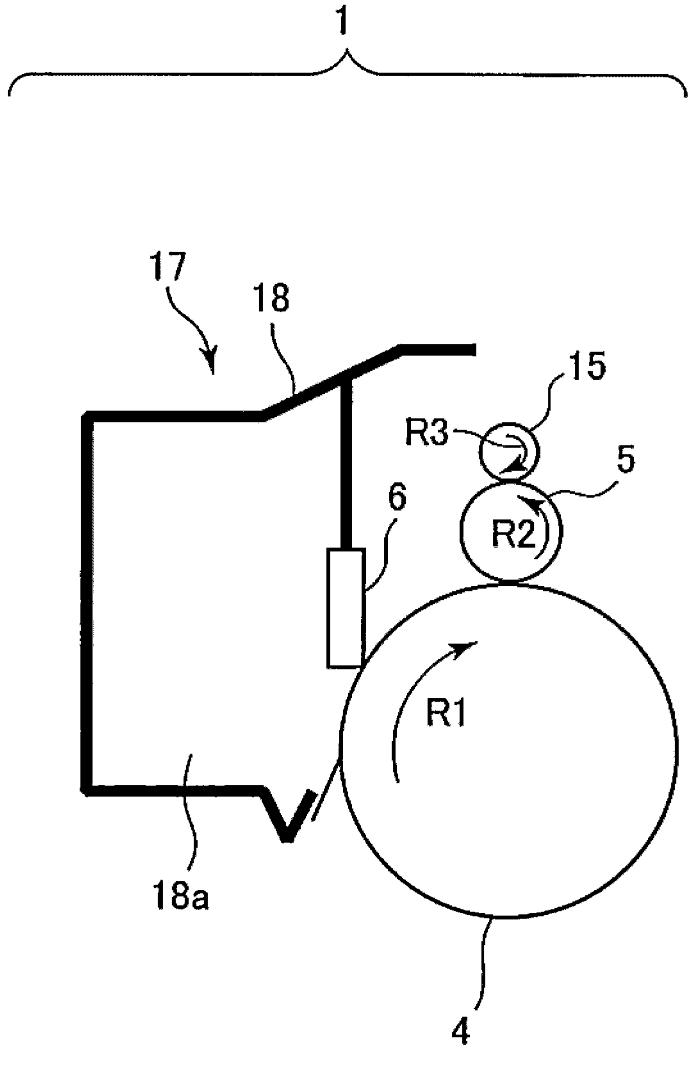
FIG. 3 is a schematic cross-sectional view of a drum unit.

As shown in FIG. 2, the process cartridge C is configured to include a drum unit 1 and a developing unit (developing device) 2. The process cartridge C is configured to be integrally mountable to and demountable from the main assembly 110 by the drum unit 1 and the developing unit 2 being connected to each other. FIG. 3 is a schematic cross-sectional view of the drum unit 1.

The drum unit 1 includes a drum frame member 18. The drum frame member 18 rotatably supports the photosensitive drum 4, the charging roller 5 and the cleaning roller 15. The charging roller 5 is disposed in contact with the photosensitive drum 4, and the cleaning roller 15 is disposed in contact with the charging roller 5. In addition, the drum frame member 18 also supports a cleaning blade 6. The cleaning blade 6 is disposed in contact with the photosensitive drum 4. In addition, the drum frame member 18 forms a removed toner chamber 18*a*. The cleaning device 17 is constituted by the cleaning blade 6 and the removed toner chamber 18*a*.

In the present Embodiment, the photosensitive drum 4 includes an OPC (organic photo conductor) photosensitive layer and has an outer diameter of 24 mm. In addition, in the present Embodiment, during the image formation, the photosensitive drum 4 is rotationally driven at a peripheral speed of 370 mm/sec in a direction of an arrow R1 (clockwise direction) in FIG. 3.

Figure 13:
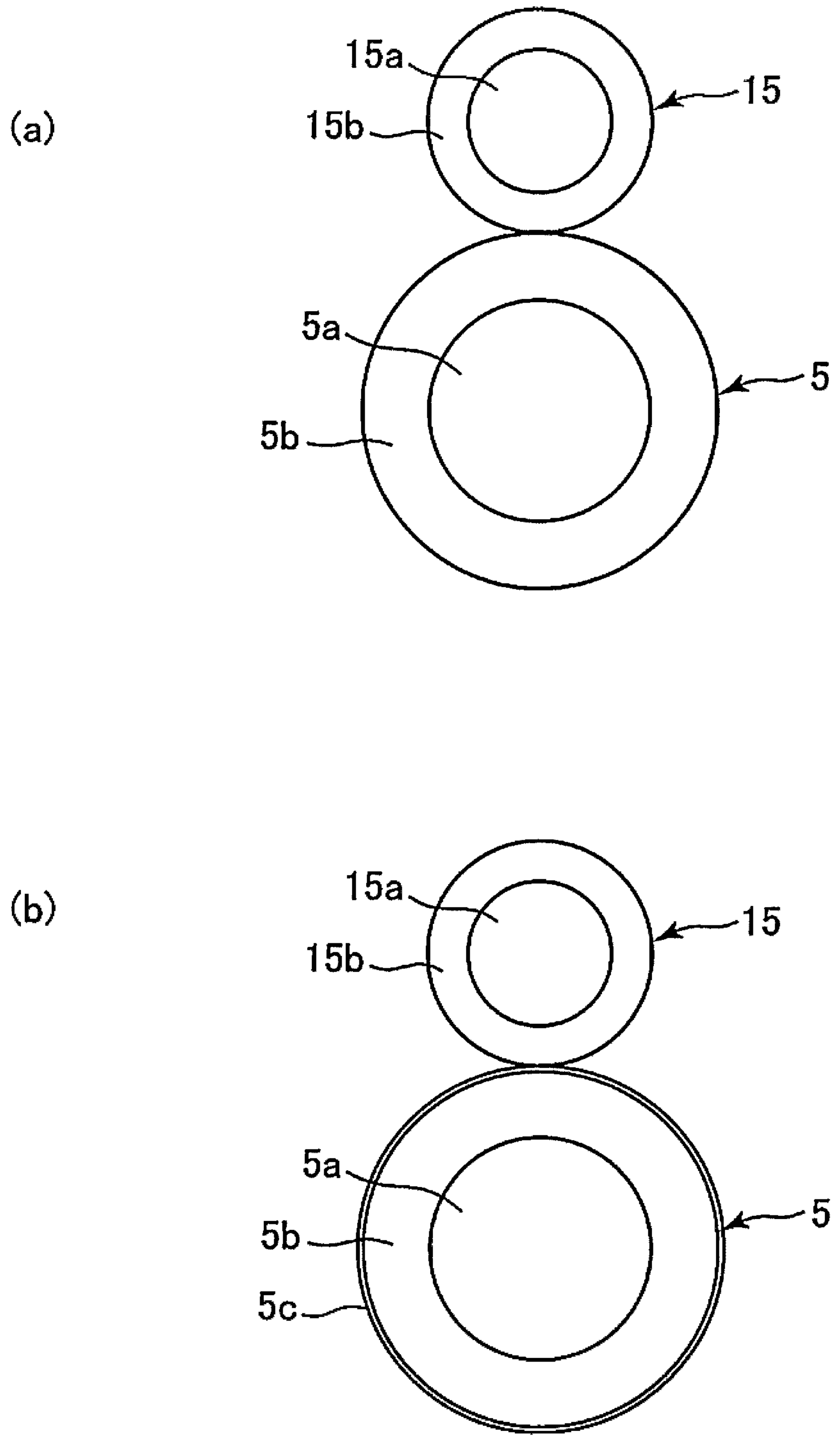
FIG. 13, part (a) and part (b), is a schematic cross-sectional view illustrating a configuration of a charging roller and a cleaning roller.

In addition, in the present Embodiment, as shown in part (a) of FIG. 13, the charging roller 5 is a conductive member (conductive elastic roller) including a core metal (supporting member, rotation shaft) 5*a* having a conductive outer peripheral surface (outer surface, outer peripheral portion) and a conductive elastic layer 5*b* provided on the outer peripheral surface of the core metal 5*a*. In the present Embodiment, as an example, an outer diameter of the core metal 5*a* of the charging roller 5 is 6 mm and an outer diameter of the elastic layer 5*b* is 8.5 mm. Incidentally, as shown in part (b) of FIG. 13, the charging roller 5 may include an additional surface layer 5*c* on an outer peripheral surface of the elastic layer 5*b*. The configuration of the charging roller 5 will be further described below. The charging roller 5 is in pressure contact with the photosensitive drum 4 with predetermined pressing force and is rotated with rotation of the photosensitive drum 4 in a direction of an arrow R2 (counterclockwise direction) in FIG. 3.

In addition, in the present Embodiment, the cleaning roller 15, which is a roller-type cleaning member as a cleaning means, is a conductive elastic roller including a core metal (supporting member, rotation shaft) 15*a* and an elastic foam layer 15*b* formed of elastic foam member covering the core metal 15*a*, as shown in part (a) and part (b) of FIG. 13. In the present Embodiment, the elastic foam layer 15*b* is formed of urethane sponge as an elastic foam member (sponge). In the present Embodiment, the cleaning roller 15 is disposed on an upper side in a vertical direction with respect to the charging roller 5. In the present Embodiment, as an example, an outer diameter of the core metal 15*a* of the cleaning roller 15 is 4 mm and an outer diameter of the elastic foam layer 15*b* is 6 mm. The configuration of the cleaning roller 15 will be further described below. The cleaning roller 15 is in pressure contact with the charging roller 5 with predetermined pressing force and is rotated with rotation of the charging roller 5 in a direction of an arrow R3 (clockwise direction) in FIG. 3.

The photosensitive drum 4, the charging roller 5 and the cleaning roller 15 are rotatably supported by the drum frame member 18 at both end portions in rotational axis directions, respectively. The rotational axis directions of the photosensitive drum 4, the charging roller 5 and the cleaning roller 15 are approximately parallel to each other.

The cleaning blade 6 as a cleaning member is a plate-shaped member made of rubber as an elastic member, and attached to the drum frame member 18 with being supported by a supporting member. The cleaning blade 6 is a plate-shaped member having a predetermined lengths in a longitudinal direction disposed approximately parallel to the rotational axis direction of the photosensitive drum 4 and in a widthwise direction approximately perpendicular to this longitudinal direction, respectively, and a predetermined thickness. The cleaning blade 6 is disposed in contact with the surface of the photosensitive drum 4 so as to face a counter direction with respect to the rotational direction of the photosensitive drum 4 (a direction in which a tip portion in the widthwise direction of the cleaning blade 6 faces an upstream side of the rotational direction of the photosensitive drum 4). The configuration of the cleaning blade 6 will be further described below.

During the image formation (charging process), to the charging roller 5, predetermined charging voltage (charging bias), which is direct current voltage of the same polarity as that of the photosensitive drum 4, is applied by a charging power source (high voltage power source), which is not shown but is provided to the main assembly 110 as a charging voltage applying means. When the charging voltage is applied to the core metal Sa of the charging roller 5 and potential difference between the surface potential of the photosensitive drum 4 and the potential of the charging roller 5 becomes electric discharge start voltage or higher, electric discharge is started between the photosensitive drum 4 and the charging roller 5, and the surface of the photosensitive drum 4 is uniformly charged. By this, dark portion potential (VD) is formed on the surface of the photosensitive drum 4. Specifically, in the present Embodiment, the direct current voltage of −1050 V is applied to the charging roller 5 as the charging voltage, and the dark portion potential VD of the surface of the photosensitive drum 4 at this time is configured to be −500 V (VD reference value). Onto the charged surface of the photosensitive drum 4, a laser beam in accordance with the image information is irradiated from an exposure device 12 provided in the main assembly 110 via an exposure opening portion provided in the process cartridge C. And light portion potential (VL) is formed on the surface of the photosensitive drum 4 by the charge of the surface disappearing due to carriers from a carrier generating layer. Specifically, in the present Embodiment, the light portion potential at this time is configured to be −100 V.

As such, the electrostatic latent image, which is an image formed by the dark portion potential VD and the light portion potential VL, is formed on the photosensitive drum 4. This electrostatic latent image is developed (visualized) by the toner T to form the toner image on the photosensitive drum 4.

The toner remaining on the photosensitive drum 4 after transferring the toner image on the photosensitive drum 4 to the recording material P (transfer remaining toner, residual toner) is removed from the photosensitive drum 4 by the cleaning blade 6 fixed on the drum frame member 18 and collected in the removed toner chamber 18*a*. After that, the surface of the photosensitive drum 4 is charged again by the charging roller 5, and the process described above is repeated.

On the other hand, the developing unit (developing device) 2 includes a developing frame member 19. The developing frame member 19 forms a developing chamber 19*a* provided with a developing sleeve 7 and a regulating blade 9, and a toner accommodating chamber 19*b* accommodating the toner T.

In the present Embodiment, the toner T is insulating one-component magnetic developer (magnetic toner). In addition, in the present Embodiment, the toner T has a volume-average particle diameter of about 8.0 μm, and is a negative toner of which the normal charging polarity is negative polarity. To the toner T, external additives, for example, such as silica particles to ensure fluidity of the toner T and to improve chargeability thereof is externally added. As the silica particles, for example, sol-gel silica particles can be used, and a mean particle diameter (primary particle diameter) thereof is, for example, 1 nm or more and 200 nm or less. Other than that, to the toner T, lubricant particles, etc., may be externally added as the external additives. In addition, in the present Embodiment, 400 g of the toner T is accommodated in the toner accommodating chamber 19*b* of the new developing unit 2 (process cartridge C).

In the toner accommodating chamber 19*b*, a stirring member 10 which stirs and conveys the toner T toward the developing chamber 19*a* is provided. The stirring member 10 includes a mounting shaft and a sheet having a fitting hole which fits with a dowel provided to the mounting shaft. In the present Embodiment, material of the sheet is polyethylene terephthalate. And the above fitting hole of the sheet is fitted into the above dowel, and by a tip of the dowel being enlarged by heat welding, the sheet is fixed on the mounting shaft. The stirring member 10 is rotatably supported by the developing frame member 19, which constitutes the toner accommodating chamber 19*b*. During the image formation (during the development), the stirring member 10 is rotationally driven in a direction of an arrow R5 (clockwise direction) in FIG. 2 by a driving motor (not shown) as a driving source, which constitutes a driving means provided in the main assembly 110. By this, the toner T in the toner accommodating chamber 19*b* is stirred and conveyed to the developing chamber 19*a*.

In the developing chamber 19*a*, the developing sleeve 7 is provided as a developer carrying member (developing member). The developing sleeve 7 is rotatably supported by the developing frame member 19, which constitutes the developing chamber 19*a*. In the present Embodiment, a surface of a non-magnetic aluminum sleeve of the developing sleeve 7 is constituted by being coated with a resin layer containing conductive particles, and surface roughness Ra (arithmetic mean roughness, JIS B 0601:1994, JIS B 0031: 1994) thereof is 1.0 μm. In addition, in the present Embodiment, an outer diameter of the developing sleeve 7 is 16.0 mm. During the image formation (during the development), the developing sleeve 7 is rotationally driven at a peripheral speed of 350 mm/sec in a direction of an arrow R4 (counterclockwise direction) in FIG. 2 by a driving motor (not shown) as a driving means, which constitutes the drive means provided in the main assembly 110. As a result, the developing sleeve 7 conveys the toner T to an opposing portion to the photosensitive drum 4 (developing portion). The developing sleeve 7 has a hollow shape, and in a hollow portion, a non-rotating magnetic roller 8, which has a multi-pole structure and is provided with a magnetic field generating means, is provided. An outer diameter of the magnetic roller 8 is 14 mm. The magnet roller 8 plays a roller for attracting the toner T to the developing sleeve 7 by magnetic force.

The developing sleeve 7 is rotatably supported by the developing frame member 19, which constitutes the developing chamber 19*a*, at both end portions in a rotational axis direction. The rotational axis direction of the developing sleeve 7 is approximately parallel to the rotational axis direction of the photosensitive drum 4.

In addition, in the developing chamber 19*a*, the regulating blade 9 as a toner amount regulating member is disposed above the developing sleeve 7. The regulating blade 9 is fixed to the developing frame member 19, which constitutes the developing chamber 19*a*. The regulating blade 9 is hung down over the developing sleeve 7 and is elastically in contact with the developing sleeve 7 with predetermined pressure. By this, the regulating blade 9 regulates the amount of the toner T carried on the developing sleeve 7, applies a thin layer of the toner T on the developing sleeve 7, and imparts electric charge to the toner T by triboelectric charging. In the present Embodiment, the regulating blade 9 is formed of silicone rubber with rubber hardness of 40° according to JIS-A hardness scale. In addition, in the present Embodiment, contact pressure Pr of the regulating blade 9 against the developing sleeve 7 is configured to be about 25 gf/cm. Incidentally, the contact pressure Pr of the regulating blade 9 against the developing sleeve 7 is expressed in terms of contact weight (gf) per unit length (1 cm) in the longitudinal direction of the developing sleeve 7.

Between the developing sleeve 7 and the photosensitive drum 4, a gap is provided by a gap retaining member (not shown). In the present Embodiment, this gap is set to 200 μm. To the developing sleeve 7, a developing power source (high voltage power source), which is not shown but provided to the main assembly 110 as a developing voltage application means, is connected. During the image formation (development), predetermined developing voltage (developing bias) is applied to the developing sleeve 7 by the developing power source. By this, predetermined electric field is formed between the photosensitive drum 4 and the developing sleeve 7 in the developing portion, and the electrostatic latent image on the photosensitive drum 4 is developed reversally by the toner T. In the present Embodiment, to the developing sleeve 7, as the developing voltage, alternating voltage, in which a direct current voltage component of −350V (developing DC bias) and an alternating current voltage component of 1200 Vpp, frequency 1500 Hz and a waveform thereof is square wave (developing AC bias) are superimposed, is applied. By applying such a developing voltage to the developing sleeve 7, it becomes possible for the toner T to jump the gap between the photosensitive drum 4 and the developing sleeve 7. By this, it becomes possible to form the toner image by making the toner T, which is charged to negative polarity, be electrically suctioned to the image portion of the electrostatic latent image on the photosensitive drum 4.

Incidentally, the driving source for the photosensitive drum 4 and each rotating member of the developing device 2 (developing sleeve 7, stirring member 10) may be configured to be common thereto.

<Photosensitive Member>

Next, the photosensitive member (photosensitive drum 4) in the present Embodiment will be further described. In the present Embodiment, the photosensitive member is configured to include a supporting member, which has a cylindrical shape and is made of metal with conductivity, an undercoat layer formed on the supporting member, and a photosensitive layer (electrical charge generating layer and electrical charge transporting layer) formed on the undercoat layer.

(Supporting Member)

The supporting member is preferably a conductive supporting member having conductivity. In addition, examples of a shape of the supporting member include a cylindrical shape, a belt shape, a sheet shape, etc. Inter alia, the supporting member is preferably the cylindrical supporting member.

As material of the supporting member, metal, resin, glass, etc. are preferable. Inter alia, the supporting member is preferably an aluminum supporting member using aluminum.

(Undercoat Layer)

On the supporting member, the undercoat layer is provided. By providing the undercoat layer, adhesive function between the supporting member and the layer thereon is enhanced, and it becomes possible to give an electrical charge injection inhibiting function to the photosensitive member.

The undercoat layer preferably contain resin. In addition, the undercoat layer may further contain electron-transporting substance, metal oxide, metal, electroconductive polymer, etc. for a purpose of enhancing electrical property. Inter alia, it is preferable to use the electron transporting substance and the metal oxide.

A mean film thickness of the undercoat layer is preferably 0.1 μm or more and 50 μm or less, more preferably 0.2 μm or more and 40 μm or less, and especially preferably 0.3 μm or more and 30 μm or less.

The undercoat layer can be formed by preparing coating solution for the undercoat layer containing each of the above material and solvent, forming a coating film with this coating solution, and drying and/or curing the coating film.

(Electrical Charge Generating Layer)

The electrical charge generating layer preferably contain an electrical charge generating substance and resin. As the electrical charge generating substance, azo pigments and phthalocyanine pigments are preferable. As the resin, polyvinyl butyral resin is more preferable.

A mean film thickness of the electrical charge generating layer is preferably 0.1 μm or more and 1 μm or less, and more preferably 0.15 μm or more and 0.4 μm or less.

The electrical charge generating layer can be formed by preparing coating solution for the electrical charge generating layer containing each of the above material and solvent, forming a coating film with this coating solution, and drying the coating film.

(Electrical Charge Transporting Layer)

The electrical charge transporting layer preferably contain an electrical charge transporting substance and resin. As the electrical charge transporting substance, a triarylamine compound and a benzidine compound are preferable.

As the resin, polycarbonate resin and polyester resin are preferable. As the polyester resin, polyarylate resin is especially preferable.

In addition, the electrical charge transporting layer may contain additives such as an antioxidant, a UV absorber, a plasticizer, a leveling agent, a slipperiness-imparting agent and a wear resistance-improving agent.

A mean film thickness of the electrical charge transporting layer is preferably 5 μm or more and 50 μm or less, more preferably 8 μm or more and 40 μm or less, and especially preferably 10 μm or more and 30 μm or less. In the present Embodiment, the mean film thickness of the electrical charge transporting layer is configured to be 23 μm.

The electrical charge transporting layer can be formed by preparing coating solution for the electrical charge transporting layer containing each of the above material and solvent, forming a coating film with this coating solution, and drying the coating film. As the solvent for the coating solution, an ether-based solvent or an aromatic hydrocarbon-based solvent are preferable.

Incidentally, in the present Embodiment, a laminate type photosensitive member provided with the electrical charge generating layer and the electrical charge transporting layer are used, however, a monolayer type photosensitive member containing both the electrical charge generating substance and the electrical charge transporting substance may also be used. The monolayer type photosensitive member can be formed by preparing coating solution for the photosensitive layer containing an electrical charge generating substance, an electrical charge transporting substance, resin, and a solvent, forming a coating film with this coating solution, and drying the coating film. As the electrical charge generating substance, the electrical charge transporting substance and the resin, the same material as the material exemplified for the laminate type photosensitive member may be used.

In addition, a protective layer may also be formed on the electrical charge transporting layer, and this protective layer may be configured to be a topmost layer of the photosensitive member.

<Cleaning Blade>

Next, the cleaning blade 6 in the present Embodiment will be further described. The cleaning device 17 includes the cleaning blade 6 as a cleaning member which is in contact with the surface of the photosensitive drum 4 to remove the toner and the external additives on the photosensitive drum 4.

In the present Embodiment, the cleaning blade 6 is made of polyurethane rubber with JIS-A hardness of 72°, held by a tip portion of a supporting member made of a sheet metal, and integrated thereto. In the present Embodiment, the cleaning blade 6 is in contact with the surface of the photosensitive drum 4 so as to face the counter direction with respect to the rotational direction of the photosensitive drum 4 (direction in which the tip portion thereof faces the upstream side of the rotational direction of the photosensitive drum 4). In addition, in the present Embodiment, the cleaning blade 6 is in contact with the photosensitive drum 4 in condition of contact pressure of 35 N/m, a penetrating amount δ of 1.3 mm, and a set angle θ of 22°.

A desired contact state of the cleaning blade 6 to the photosensitive drum 4 in order to remove the toner and the external additives on the photosensitive drum 4 can be selected according to the material of the photosensitive drum 4 and the cleaning blade 6. It is possible to achieve the desired contact state by changing design values other than the hardness, such as the contact pressure, the penetrating amount, and the set angle, as following.

The penetrating amount δ is a penetrating length of a distal end surface of the cleaning blade 6 with assuming that the tip portion of the cleaning blade 6 is not deformed and penetrates into the photosensitive drum 4 in a cross section approximately perpendicular to the rotational axis direction of the photosensitive drum 4. In addition, the set angle θ is an angle formed by a tangential line of the photosensitive drum 4 at a point where the distal end surface of the cleaning blade 6 crosses the photosensitive drum 4 and an axial line of the cleaning blade 6 in the cross section approximately perpendicular to the rotational axis direction of the photosensitive drum 4.

In order to remove the toner and the external additives effectively, the penetrating amount δ is preferably in a range of 0.5 mm or more and 1.8 mm or less. This is because if the penetration amount δ is smaller than the above range, a phenomenon in which the toner slips through the cleaning blade 6 (hereinafter also referred to as a "toner slipping") may occur, and if the penetration amount δ is larger than the above range, load for rotationally driving the photosensitive drum 4 may become too large. In addition, in order to obtain a sufficient length (contact distance) in which the photosensitive drum 4 and the cleaning blade 6 is in contact, the penetrating amount δ is further preferably in a range of 1.0 mm or more and 1.8 mm or less.

In addition, in order to remove the toner and the external additives effectively, the set angle θ is preferably in a range of 20 degrees or more and 32 degrees or less. This is because if the set angle θ is smaller than the above range, the toner slipping may occur, and if the setting angle θ is larger than the above range, a turning up of the cleaning blade 6 or slipping noise may occur. In addition, in order to balance the pressure in which the photosensitive drum 4 and the cleaning blade 6 is in contact (contact pressure) and a margin against the turning up of the cleaning blade 6, the set angle θ is further preferably in a range of 20 degrees or more and 25 degrees or less.

In addition, in order to remove the toner and the external additives effectively, the contact pressure of the cleaning blade 6 against the photosensitive drum 4 is preferably in a range of 30 N/m or more and 80 N/m or less. This is because if the contact pressure is smaller than the above range, good cleaning performance may not be obtained, and if the contact pressure is larger than the above range, the load for rotationally driving the photosensitive drum 4 may become too large. In addition, in order to increase the pressure in which the photosensitive drum 4 and the cleaning blade 6 is in contact (contact pressure), the contact pressure is further preferably in a range of 40 N/m or more and 80 N/m or less. Incidentally, the contact pressure of the cleaning blade 6 against the photosensitive drum 4 is expressed as a contact weight (N) per unit length (1 m) in the longitudinal direction of the photosensitive drum 4.

As material for the cleaning blade 6, for example, polyurethane, silicone rubber, fluorine rubber, chloroprene rubber, butadiene rubber, etc. can be used. Inter alia, polyurethane is preferable since an appropriate strength and flexibility to contact the rotating photosensitive drum 4 can be obtained.

The cleaning blade 6 may be configured so that the JIS-A hardness of an entire cleaning blade 6 is within the desired range, however, it may also be configured that the cleaning blade 6 includes a cured layer, whose JIS-A hardness is within the desired range, in a portion in contact with the photosensitive drum 4. By making only the portion of the cleaning blade 6, which is in contact with the photosensitive drum 4, be the cured layer of high hardness, it becomes easier to adjust hardness of a main body of the cleaning blade 6 to obtain flexibility to an extent that the cleaning blade 6 can flex appropriately when the cleaning blade 6 is in contact with the photosensitive drum 4.

The cured layer may be a layer provided on the surface of the cleaning blade 6, but from a viewpoint of increasing durability, the layer is preferably a portion of the main body of the cleaning blade 6 being processed.

In a case in which polyurethane is used as a base material for the cleaning blade 6, the cured layer can be formed as following. That is, a portion of the cleaning blade 6 which is in contact with the photosensitive drum 4 is impregnated with an isocyanate compound for a certain period of time. And by allowing the polyurethane contained in the main body of the cleaning blade 6 to react with the isocyanate compound, it is possible to form the reacted portion as the cured layer.

<Charging Roller>

Next, the charging roller 5 in the present Embodiment will be further described.

(Outline of the Elastic Layer)

In the present Embodiment, the charging roller 5 has the elastic layer. Hereinafter, the elastic layer of the charging roller 5 will be described.

For the elastic layer, one type or two or more types of elastic member such as rubber which is conventionally used for the elastic layer (electroconductive elastic member layer) of the charging roller can be used. Examples of the rubber include the following. Urethane rubber, silicone rubber, butadiene rubber, isoprene rubber, chloroprene rubber, styrene-butadiene rubber, ethylene-propylene rubber, polynorbornene rubber, styrene-butadiene-styrene rubber, acrylonitrile rubber, epichlorohydrin rubber and alkyl ether rubber.

In addition, electroconductivity of the elastic layer can be adjusted to a predetermined value by making an electroconductive agent be contained in the material thereof appropriately. Electrical resistivity of the elastic layer can be adjusted by selecting a type and a usage amount of the conductive agent, and a suitable range of the electrical resistivity is $10^2$ to $10^8$ Ωcm, and a more suitable range is $10^3$ to $10^6$ Ωcm. As the conductive agent for the elastic layer, conductive carbon such as Ketjen black EC, acetylene black, carbon for rubber, oxidized carbon for a color (ink), and pyrolytic carbon can be used. In addition, as the conductive agent for the elastic layer, graphite such as natural graphite and artificial graphite can also be used. To the material of the elastic layer, inorganic or organic filler or cross-linking agent may be added.

(Elastic Layer Having a Matrix-Domain Structure)

As the elastic layer of the charging roller 5, the elastic layer having a matrix-domain structure can be suitably used. The matrix-domain structure is a structure having a matrix and plurality of domains dispersed in this matrix.

—Method for Forming the Matrix-Domain Structure—

A method for forming the matrix-domain structure will be described.

A configuration having the domain as a conductive phase and the matrix as an insulating phase can be obtained by a method of phase separation or dispersion of conductive material and insulating material. Inter alia, as an electroconductive member for an electrophotography, it is preferable to obtain the structure by the following method in order to stably express function thereof upon being in contact with another member. In other words, it is preferable that the elastic layer have a phase-separated structure of a matrix-domain type by the phase separation of a matrix containing a first rubber with insulating property and a second rubber with conductive property.

The elastic layer having the matrix-domain structure in the charging roller 5, which is an electroconductive member, preferably satisfy the following condition (i) and condition (ii).

Condition (i): Volume resistivity of the matrix is more than $1.0\times10^8$ Ω·cm and equal to or less than $1.0\times10^{17}$ Ω·cm.

Condition (ii): Volume resistivity of the domain is equal to or more than $1.0\times10^1$ Ω·cm and equal to or less than $1.0\times10^4$ Ω·cm.

Figure 12:
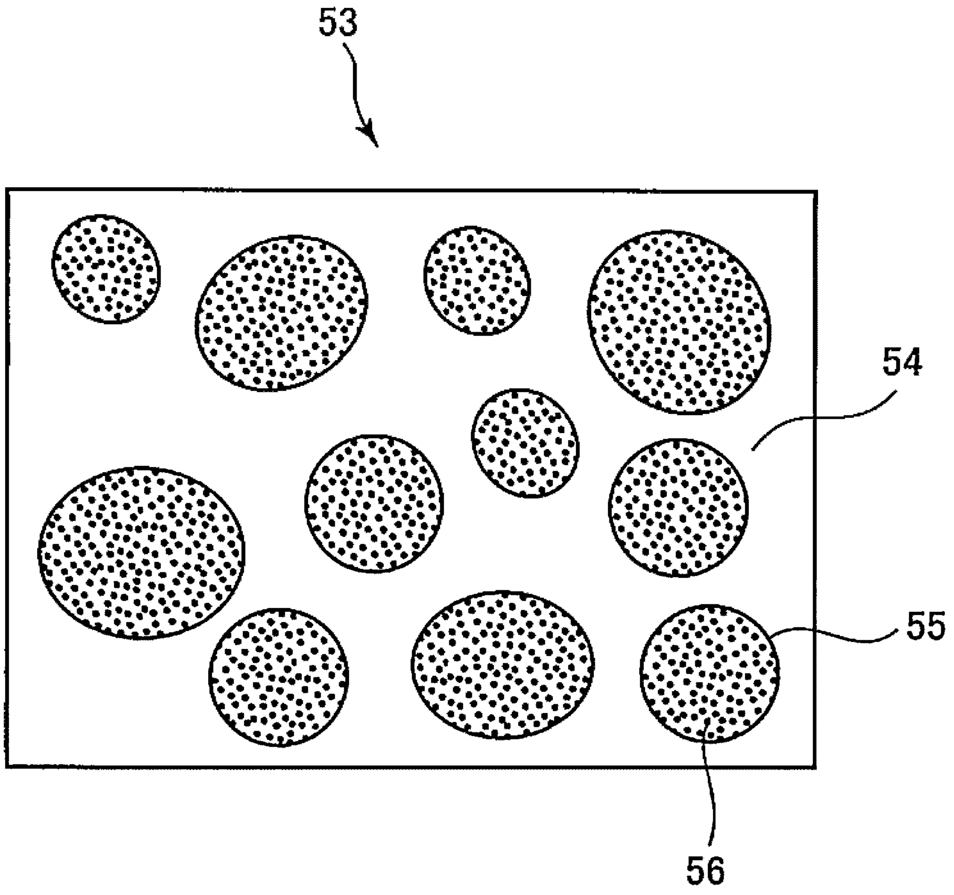
FIG. 12 is a schematic view illustrating a matrix-domain structure.

FIG. 12 illustrates a schematic partial cross-sectional view of the elastic layer in a direction perpendicular to the longitudinal direction of the charging roller (conductive roller) 5. An elastic layer 53 (corresponding to the elastic layer 5*b* in part (a) and part (b) of FIG. 13) has the matrix-domain structure with a matrix 54 and domains 55. And the domains 55 contain the conductive agent. Preferably, the domains 55 contain a conductive particle 56, which is an electroconductive agent, as the conductive agent.

—Method for Measuring the Volume Resistivity of the Matrix—

The volume resistivity of the matrix can be measured by thinning the elastic layer and measuring it with a microprobe. Examples of means for thinning include, for example, a sharp razor, a microtome, and a focused ion beam (FIB) method, etc.

Upon manufacturing thin pieces, it is necessary to eliminate influence of domains and measure the volume resistivity of the matrix only, and therefore, it is necessary to manufacture the thin pieces with a film thickness smaller than a distance between domains measured in advance with a scanning electron microscope (SEM) or a transmission electron microscope (TEM), etc. Therefore, as the means for thinning, a means capable of manufacturing a very thin sample, such as the microtome is preferable.

In the measurement of the volume resistivity, first, after grounding one side of the thin piece, locations of the matrix and the domains in the thin piece are identified, respectively. Identification of these locations can be performed by means capable of measuring the volume resistivity or distribution of hardness of the matrix and the domains, respectively, such as a scanning probe microscope (SPM) or an atomic force microscope (AFM). Next, a probe is brought into contact with the matrix, DC voltage of 50 V is applied for 5 seconds, an arithmetic mean value of a ground current value for 5 seconds is measured, and electrical resistivity is calculated by dividing the arithmetic mean value by the voltage. A measured value of the volume resistivity can then be obtained by converting the electrical resistivity to the volume resistivity using the film thickness of the flake. At this time, a means capable of measuring a shape of the thin piece as well, such as the SPM and the AFM, is preferable since the film thickness of the thin piece can be measured and then the volume resistivity can be measured.

The volume resistivity of the matrix in the elastic layer of the charging roller 5, which is a cylindrical electroconductive member, can be calculated as following. That is, it can be obtained by cutting out one thin piece sample from respective areas of the elastic layer, which is divided into four regions in a peripheral direction and five regions in a longitudinal direction equally, obtaining the above measured value, and then calculating an arithmetic mean value of the volume resistivity of the 20 samples in total.

—Volume Resistivity of the Domain—

The volume resistivity of the individual domain is less than the volume resistivity of the matrix. This is preferable because it becomes possible to suppress unwanted transfer of electric charge in the matrix and easier to limit a transport path of the electric charge to a path via a plurality of the domains.

In addition, the volume resistivity of the domain is preferably smaller in five orders of magnitude than the volume resistivity of the matrix.

It is preferable to configure that the volume resistivity of the domain is equal to or more than $1.0\times10^{1}$ Ω·cm and equal to or less than $1.0\times10^{4}$ Ω·cm. By configuring the volume resistivity of the domains to be in a lower state, it becomes possible to suppress unwanted transfer of the electric charge in the matrix and easier to limit the transport path of the electric charge to the path via a plurality of the domains more effectively. By lowering the volume resistivity of the domain to the range, an amount of the electric charge moving among the domains can be dramatically improved, therefore it becomes possible to limit the transport path of the electric charge to the path via the domains.

The volume resistivity of the domain can be adjusted by using a conductive agent for a rubber component of the domain, and making the conductivity of the rubber component to a predetermined value. The volume resistivity of the domain can be adjusted by selecting a type of an electroconductive agent and an addition amount thereof appropriately. As the conductive agent used to control the volume resistivity of the domain to be $1.0\times10^{1}$ Ω·cm to $1.0\times10^{4}$ Ω·cm, an electroconductive agent which can significantly change the volume resistivity from high resistance to low resistance in response to a dispersed amount is preferable.

Examples of the electroconductive agents blended in the domain include carbon black, graphite, oxides such as titanium oxide and tin oxide; metals such as Cu and Ag; particles whose surface is coated by oxides or metals and which are made to be conductive. In addition, if necessary, two or more types of these conductive agents may be used with blending appropriate amounts.

Among the above electroconductive agents, it is preferable to use the conductive carbon black, which has large affinity for rubber and allows easy control of a distance between the electroconductive agents. A type of the carbon black blended in the domain is not limited. Specifically, examples the carbon black include gas furnace black, oil furnace black, thermal black, lamp black, acetylene black and Ketjen black.

In addition, if necessary, a filler, a processing aid, a cross-linking aid, a cross-linking accelerator, an anti-aging agent, a cross-linking accelerating aid, a cross-linking retarder, a softener, a dispersant, a colorant, etc., which are generally used as a blending agent for rubber, may be added to the rubber composition for the domain to an extent that does not impair effect of the present invention.

—Method for Measuring the Volume Resistivity of the Domain—

A measurement of the volume resistivity of the domain may be performed by the same method as the method for measuring the volume resistivity of the matrix described above, except that a measurement point is changed to a location corresponding to the domain and the applied voltage at the time of measuring the current value is changed to 1 V.

—Method for Manufacturing—

The charging roller 5, which is the electroconductive member provided with the elastic layer having the matrix-domain structure, can be formed, for example, by a method including the following steps (i) through (iv).

Step (i): a step of preparing a rubber mixture for forming the domain containing the carbon black and the second rubber (hereinafter, also referred to as "CMB");

Step (ii): a step of preparing a rubber mixture for forming the matrix containing the first rubber (hereinafter, also referred to as "MRC");

Step (iii): a step of kneading the CMB and the MRC to prepare a rubber mixture having the matrix-domain structure;

Step (iv): a step of forming a layer of the rubber mixture prepared in the step (iii) on a core metal (conductive supporting member) directly or with another layer therebetween, and curing the layer of the rubber mixture to form the elastic layer.

And the volume resistivity of each of the matrix and the domain can be controlled, for example, by selecting material used in each of the above steps and by adjusting manufacturing conditions. This will be described below.

First, regarding the condition (i), the volume resistivity of the matrix is determined by composition of the MRC.

As the first rubber used for the MRC, at least one type of rubber having low conductivity such as natural rubber, butadiene rubber, butyl rubber, acrylonitrile butadiene rubber, urethane rubber, silicone rubber, fluorine rubber, isoprene rubber, chloroprene rubber, styrene-butadiene rubber, ethylene-propylene rubber, and polynorbornene rubber can be used. In addition, to the MRC, assuming that the volume resistivity of the matrix can be adjusted within the above range, if necessary, a filler, a processing aid, a cross-linking agent, a cross-linking aid, a cross-linking accelerator, a cross-linking accelerating aid, a cross-linking retarder, an anti-aging agent, a softener, a dispersant and a colorant may be added. On the other hand, it is preferable to configure the MRC not to contain an electroconductive agent such as carbon black in order to keep the volume resistivity of the matrix within the above range.

In addition, regarding the condition (ii), the volume resistivity of the domain can be adjusted by an amount of the electroconductive agent in the CMB.

For example, take a case in which conductive carbon black having DBP oil absorption of 40 $cm^3$/100 g or more and 170 $cm^3$/100 g or less is used as the electroconductive agent, as an example. In this case, the condition (ii) can be achieved by preparing the CMB so as to contain the conductive carbon black in an amount of 40 mass % or more and 200 mass % or less based on a total mass of the CMB. Here, examples of the second rubber which can be used for the CMB include natural rubber (NR), isoprene rubber (IR), butadiene rubber (BR), styrene-butadiene rubber (SBR), butyl rubber (IIR), ethylene-propylene rubber (EPM, EPDM), chloroprene rubber (CR), nitrile rubber (NBR), hydrogenated nitrile rubber (H-NBR), silicone rubber, and urethane rubber (U). At least one type of these can be used.

—Method for Confirming the Matrix-Domain Structure—

Presence of the matrix-domain structure in the elastic layer can be confirmed by making the thin piece from the elastic layer and observing a fracture surface formed in the thin piece in detail.

Examples of means for thinning the elastic layer include, for example, a sharp razor, a microtome, an FIB, etc. In addition, in order to perform more accurate observation of the matrix-domain structure, a pretreatment, by which contrast between the domain as the conductive phase and the matrix as the insulating phase can be obtained suitably, such as a dyeing treatment or a vapor deposition treatment may be applied on the thin piece for the observation.

The presence of the matrix-domain structure can be confirmed by observing the fracture surface with a laser microscope, a scanning electron microscope (SEM), a transmission electron microscope (TEM), etc. on the thin piece subjected to the formation of the fracture surface and the pretreatment as necessary. As a method for easily and accurately confirming the domain-matrix structure (sea-island structure), it is preferable to observe with the scanning electron microscope (SEM).

After obtaining the thin piece of the elastic layer by the method as described above, an image which can be obtained by observing the surface of the thin piece at a magnification of 1,000 times to 10,000 times is obtained. After that, a 256-tone monochrome image is obtained by performing 8-bit grayscale conversion using an image processing means such as “Image-Pro Plus” (available from Media Cybernetics, Inc.). Next, black and white of the image is inverted so that the domain in the fracture surface becomes white, and binarized to obtain an analysis image. The presence or absence of the matrix-domain structure may be determined based on the analysis image which has been image-processed to a state in which the domain and the matrix is distinguishable by binarization.

When the analysis image includes a structure in which a plurality of the domains 55 exist in an isolated state in the matrix 54 as illustrated in FIG. 12, the presence of the matrix-domain structure in the elastic layer can be confirmed. The isolated state of the domains may be a state in which each domain is disposed not connected to other domains while the matrix is connected in the image, and the domains are separated by the matrix. Specifically, when a region within 50 μm square in the analysis image is defined as an analysis region, a state in which a number of the domains exist in the isolated state as described above is 80 number % or more with respect to a total number of domain groups which do not have contact with a frame line of the analysis region is defined as a state including the matrix-domain structure (sea-island structure).

The confirmation as described above on the elastic layer of the charging roller 5, which is the cylindrical electroconductive member, may be performed by dividing the elastic layer equally into five regions in the longitudinal direction, equally into four regions in the circumferential direction, manufacturing one thin piece from each region arbitrarily to a total of 20 thin pieces, and performing the above measurement.

(Surface Layer)

The charging roller 5 in the present Embodiment may have a configuration in which the surface layer is laminated outside the elastic layer. This surface layer may be configured to be the topmost layer of the charging roller 5. However, as described in detail below, storage elastic modulus E'C of the surface of the charging roller 5 and storage elastic modulus E'CC of the elastic foam layer of the cleaning roller 15 need to satisfy relationship of E'C>E'CC. Hereinafter, the surface layer of the charging roller 5 will be described.

—Binder Resin—

As a binder used for the surface layer, known binder can be employed. Examples thereof include resin, natural rubber, vulcanized natural rubber, synthetic rubber, etc. As the resin, resin such as thermosetting resin and thermoplastic resin can be used. Inter alia, fluorine resin, polyamide resin, acrylic resin, polyurethane resin, silicone resin and butyral resin are more preferable.

The surface layer preferably contain a conductive substance. Examples of the conductive substance include an ionic conductive agent, an electroconductive agent, etc.

Examples of the ion conductive agent include the following. Inorganic ionic substance such as lithium perchlorate, sodium perchlorate and calcium perchlorate, cationic surfactant such as lauryltrimethylammonium chloride, stearyltrimethylammonium chloride, octadecyltrimethylammonium chloride, dodecyltrimethylammonium chloride, hexadecyltrimethylammonium chloride, trioctylpropylammonium bromide and modified aliphatic dimethylethylammonium ethosulfate, zwitterionic surfactant such as lauryl betaine, stearyl betaine and dimethylalkyllauryl betaine, quaternary ammonium salt such as tetraethylammonium perchlorate, tetrabutylammonium perchlorate and trimethyloctadecylammonium perchlorate, and lithium salt of organic acid such as trifluoromethanesulfonic acid lithium. These can be used alone or in combination of two or more types.

Examples of the electroconductive agent include the following. Metallic fine particles and fibers such as aluminum, palladium, iron, copper and silver, and metal oxides such as titanium oxide, tin oxide and zinc oxide with applying an electroconductive treatment. Composite particles with a surface treatment by electrolytic treatment, spray coating, mixing and shaking, etc. on surfaces of the above metallic particles, the fibers, and the metal oxides. Carbon powders such as furnace black, thermal black, acetylene black, Ketjen black, polyacrylonitrile (PAN)-based carbon, and pitch-based carbon.

Examples of the furnace black include the following. SAF-HS, SAF, ISAF-HS, ISAF, ISAF-LS, I-ISAF-HS, HAF-HS, HAF, HAF-LS, T-HS, T-NS, MAF, FEF, GPF, SRF-HS-HM, SRF-LM, ECF, FEF-HS. Examples of the thermal black include FT and MT. In addition, these conductive agents can be used alone or in combination of two or more types.

In addition, the conductive agent preferably has a mean particle diameter of 0.01 μm or more and 0.9 μm or less, and more preferably 0.01 μm or more and 0.5 μm or less. Within this range, the control of the volume resistivity becomes easier.

In addition, it is preferable that an addition amount of the conductive agent added to the surface layer for 100 parts by mass of the binder be 2 parts by mass or more and 80 parts by mass or less, and more preferably 20 parts by mass or more and 60 parts by mass or less.

Surface of the conductive agent may be subjected to a surface treatment. As a surface treatment agent, organosilicon compounds such as alkoxysilane, fluoroalkylsilane and polysiloxane, and various types of coupling agent such as silane-based, titanate-based, aluminate-based and zirconate-based coupling agent, oligomers and polymer compounds can be used. These may be used alone or two or more types. The surface treatment agent is preferably the organosilicon compounds such as alkoxysilane and polysiloxane, and the various types of coupling agent such as silane-based, titanate-based, aluminate-based or zirconate-based coupling agent, and is more preferably the organosilicon compounds.

In addition, the surface layer may be subjected to a surface treatment. Examples of the surface treatment include surface processing treatment using ultraviolet (UV) light or electron beams, and surface modification treatment in which compounds, etc. are adhered and/or impregnated to the surface.

In addition, a mean film thickness of the surface layer is preferably 0.1 μm or more and 100 μm or less, and is more preferably 1 μm or more and 50 μm or less. By configuring within this range, formation of the surface layer which satisfies the relationship E'C>E'CC described below becomes easier.

—Formation of the Surface Layer—

The surface layer can be formed by an applying method such as an electrostatic spray application or a dipping application. Alternatively, the surface layer can be formed by bonding or covering a lower layer (the elastic layer) with a sheet-shaped or tube-shaped layer which is deposited to a predetermined film thickness in advance. Alternatively, for the formation of the surface layer, a method in which material is cured and molded into a predetermined shape in a mold can be used. Inter alia, it is preferable to form a coating film by applying paint by the applying method. In a case in which a layer is formed by the applying method, as solvent used for the applying solution, any solvent which can dissolve the binder resin can be used. Specifically, examples thereof include alcohols such as methanol, ethanol and isopropanol; ketones such as acetone, methyl ethyl ketone and cyclohexanone; amides such as N,N-dimethylformamide and N,N-dimethylacetamide, sulfoxides such as dimethyl sulfoxide, ethers such as tetrahydrofuran, dioxane, ethylene glycol monomethyl ether, esters such as methyl acetate and ethyl acetate, aromatic compounds such as xylene, ligroin, chlorobenzene and dichlorobenzene, etc. These solvents are selected depending on the binder resin used. As a method for dispersing binders and particles in the applying solution, a known solution dispersing method such as ball mill, sand mill, paint shaker, dyno mill, pearl mill can be used.

(Configuration of the Charging Roller)

The charging roller 5 in the present Embodiment can be formed, for example, by using the materials in the above examples as appropriate. However, as described in detail below, the storage elastic modulus E'C of the surface of the charging roller 5 and the storage elastic modulus E'CC of the elastic foam layer of the cleaning roller 15 need to satisfy the relationship of E'C>E'CC.

The elastic layer of the charging roller 5 need not have the matrix-domain structure. The elastic layer of the charging roller 5 may, for example, be constituted by a substantially homogeneous rubber layer having preferable electrical properties described above. However, in a case in which the elastic layer of the charging roller 5 has the matrix-domain structure, electric discharge of the charging roller 5 to the photosensitive drum 4 becomes a micro-electric discharge. By this, it becomes difficult for the external additives which are separated from the toner, especially those having electric charge of reverse polarity to the normal charging polarity of the toner (positive electric charge in the present Embodiment), to adhere firmly to the photosensitive drum 4. Therefore, it becomes easier to scrape off the external additives with the cleaning blade 6 and suppress contamination of the charging roller 5. For such a reason, the elastic layer of the charging roller 5 preferably has the matrix-domain structure.

In addition, the charging roller 5 is not limited to a single-layer configuration of the elastic layer or a two-layer configuration of the elastic layer and the surface layer. The elastic layer may be constituted by a plurality of layers of different materials and structures, another layer may be provided between the core metal and the elastic layer, or another layer may be provided between the elastic layer and the surface layer.

(Characteristics of the Surface of the Charging Roller)

—Outline of the Characteristics of the Surface of the Charging Roller—

In the present Embodiment, the image forming apparatus 100 is configured so that the storage elastic modulus E'C of the surface (topmost surface, outer peripheral surface) of the charging roller 5 and the storage elastic modulus E'CC of the elastic foam layer of the cleaning roller 15 satisfy the relationship of E'C>E'CC. Magnitude of the storage elastic modulus (E') correlates with physical adhesive force, and when the storage elastic modulus (E') is small, the physical adhesive force is higher than when the storage elastic modulus (E') is large. Therefore, when the relationship of E'C>E'CC is satisfied, the external additives on the surface of the charging roller 5 have the higher adhesive force to the cleaning roller 15 than to the charging roller 5. When the charging roller 5 and the cleaning roller 15, which are rotating members, are rotated in contact with each other, there is usually some difference in moving speed of both surfaces, even if the moving speeds of both surfaces are aimed to be the same speed. This difference in speed is, for example, about ±5%. In particular, when the cleaning roller 15 is rotated with rotation of the charging roller 5, as in the present Embodiment, the moving speed of the surface of the cleaning roller 15 is slightly slower than the moving speed of the surface of the charging roller 5. In a state in which the external additives adheres more easily to the cleaning roller 15 than to the charging roller 5 as described above, such a difference in speed may cause the external additives to be gathered by a cell skeleton of the elastic foam layer of the cleaning roller 15 and likely to be gathered into a lump on the charging roller 5. Furthermore, deformation of the cell skeleton of the elastic foam layer of the cleaning roller 15 upon being released from a compressed state caused by the contact with the charging roller 5 acts to bounce the lump of the external additives described above and lift the lump off the surface of the charging roller 5. In this state, when the surface of the charging roller 5 comes into contact with the surface of the photosensitive drum 4, the external additives are easily removed from the surface of the charging roller 5 since the external additives are in the lump-shape and easily adhere to the surface of the photosensitive drum 4.

In addition, preferably, by configuring Martens hardness of the surface of the charging roller 5 (topmost surface, outer peripheral surface) to be 15 $N/mm^2$ or more, the external additives which are in the lump-shape on the surface of the charging roller 5 as described above can be more vigorously flicked and lifted.

Thus, in the present Embodiment, by configuring to satisfy the relationship of E'C>E'CC, the cleaning roller 15 acts so as not to scrape the external additives from the charging roller 5, but lifts the external additives off the charging roller 5 and returns the external additives to the photosensitive drum 4 upon being in contact with and separating from the charging roller 5. In addition, this action can be more effectively obtained by configuring the Martens hardness of the surface of the charging roller 5 to be 15 $N/mm^2$ or more. By this configuration, it becomes possible to maintain removing effect of the external additives from the charging roller 5 by the cleaning roller 15 for a longer period of time and suppress the contamination of the charging roller 5 for a longer period of time. As a result, it becomes advantageous to extend a service life of the process cartridge C.

Incidentally, here, the removal of the external additives, which becomes problematic when accumulating on the surface of the charging roller 5 due to a long-term use of the process cartridge C, will be described in particular, however, the toner can also be removed by the same mechanism. In addition, a part of the toner may be stored in space portions of the elastic foam layer of the cleaning roller 15. Even in that case, according to the present Embodiment, since the toner can be returned from the charging roller 5 to the photosensitive drum 4 by the mechanism described above, clogging in the space portions of the elastic foam layer of the cleaning roller 15 by the toner can be suppressed. Therefore, it becomes easier to maintain good cleaning performance of the cleaning roller 15 over a longer period of time.

—Storage Elastic Modulus—

The storage elastic modulus (E') is an ability to retain stress stored inside a substance such as rubber or resin and is an index closely correlating with hardness of the substance. Magnitude of the storage elastic modulus (E') correlates with the physical adhesive force. Therefore, by configuring the storage elastic modulus E'C of the surface of the charging roller 5 and the storage elastic modulus E'CC of the elastic foam layer of the cleaning roller 15 satisfy the relationship of E'C>E'CC, it becomes possible to make the adhesive force of the external additives to the cleaning roller 15 higher than the adhesive force to the charging roller 5. The storage elastic modulus (E') is typically measured using a dynamic viscoelasticity analyzer (also referred to as a dynamic mechanical analyzer, DMA).

In addition, a value of the storage elastic modulus (E') may vary significantly depending on measuring temperature and measuring frequency. Therefore, in the present Embodiment, the measuring temperature of the storage elastic modulus (E') is configured to be 23° C. and 50% RH (relative humidity), which is the same condition as a condition used upon evaluating the removing effect of the contamination of the charging roller 5, as described below. In addition, an excitation frequency of vibration which actually occurs upon driving the image forming apparatus 100 differs depending on a rotation speed of the charging roller 5, difference in peripheral speed of the photosensitive drum 4 and the cleaning roller 15, which contact the charging roller 5, the configuration of the surface of the charging roller 5 (surface of the elastic layer and the surface layer), etc. Thus, in the present Embodiment, the measuring frequency of the storage elastic modulus (E') is set at 10 Hz, which is around an average value of the excitation frequency in the actual apparatus.

Furthermore, the value of the storage elastic modulus (E') may vary depending on a depth from the surface of the charging roller 5 (topmost surface, outer peripheral surface). Therefore, in the present Embodiment, the storage elastic modulus E'C of the surface of charging roller 5 is defined as a value measured at a depth within 10 μm from the surface of charging roller 5. Here, in a case in which the surface of the charging roller 5 (topmost surface, outer peripheral surface) is constituted by the elastic layer, the value of the storage elastic modulus (E') of the surface of the charging roller 5 is defined as a value measured at a depth within 10 μm from the surface of the elastic layer.

In addition, in a case in which the surface of the charging roller 5 (topmost surface, outer peripheral surface) is formed by the surface layer formed on the elastic layer, the value of the storage elastic modulus (E') of the surface of the charging roller 5 is defined as a value measured at a depth within 10 μm from the surface of the surface layer. This is because it is found that the storage elastic modulus (E') within the depth of about 10 μm from the surface of the charging roller 5 correlates with adhesion of the external additives. Incidentally, a method for measuring the storage elastic modulus E'CC of the elastic foam layer of the cleaning roller 15 will be further described below.

To further describe, in order to examine the rubber hardness of the surface of charging roller 5, the storage elastic modulus E'C of the surface of the charging roller 5 is measured as following. The measurement of the storage elastic modulus E'C of the surface of the charging roller 5 is performed using a dynamic viscoelasticity measuring device (trade name: EPLEXOR-500N, manufactured by GABO). A measuring sample is fractionated with a microtome from the surface of the charging roller 5 to a depth of about 10 μm, as described above. Measurement of the storage elastic modulus (E') is performed under the following conditions.

[Measuring Conditions]

Measuring mode: Tensile testing mode

Measuring frequency: 10 Hz

Measuring temperature: 23° C.

Measured humidity: 50% RH

Transducer: 25N

Dynamic distortion: 1.0%.

Static distortion: 2.0%.

Measuring sample shape: Width 5.0 mm×Length 20 mm

—Martens Hardness—

The Martens hardness is a physical property value which can be obtained by pressing an indenter into a measurement target with applying a load, and is a value obtained as (testing load)/(surface area of the indenter under the testing load) ($N/mm^2$). In the Martens hardness, both components of plastic deformation and elastic deformation are included.

The Martens hardness of the surface (topmost surface, outer peripheral surface) of the charging roller 5 is preferably 15 $N/mm^2$ or more from a viewpoint of efficiently lifting and moving the external additives adhered to the surface of the charging roller 5. In other words, by configuring the Martens hardness of the surface of the charging roller 5 to be 15 $N/mm^2$ or more, the cell skeleton of the foam elastic member of the cleaning roller 15 can more vigorously flick the lump of the external additives formed on the surface of the charging roller 5 and lift them off the surface of the charging roller 5. This is considered that, because the surface of the charging roller 5 is hard, temporal transition from a compressed state to a released state of the cell skeleton of the cleaning roller 15 is quickened at a moment when the charging roller 5 exits a contacting portion between the charging roller 5 and the cleaning roller 15, as described below. From this perspective, the Martens hardness of the surface of the charging roller 5 is preferably configured to be 15 $N/mm^2$ or more, and more preferably be 25 $N/mm^2$ or more. However, in view of a limitation of the resin materials which can form the charge roller 5 using thermosetting resin and thermoplastic resin, the Martens hardness of the surface of the charge roller 5 is configured to be 40 $N/mm^2$ or less. In addition, from a viewpoint to suppress that the surface of the charging roller 5 is contaminated by the charging roller 5 squashing the toner and the external additives which has slipped through the cleaning blade 6, the Martens hardness of the surface of the charging roller 5 is more preferably configured to be 35 $N/mm^2$ or less, and further preferably be 30 $N/mm^2$ or less.

Measurement of the Martens hardness of the surface of charging roller 5 is performed using a micro hardness tester (trade name: PICODENTOR HM500, manufactured by Helmut Fischer GmbH), which is a surface coating film property tester. In addition, as software, "WIN-HCU" (trade name), which is included with the surface coating film property tester described above, is used.

The indenter such as a square pyramid is pressed into a measured object with applying a predetermined relatively small testing load, and a surface area, of which the indenter is in contact with the measured object, is determined from an indentation depth at a time when a predetermined indented depth is reached, and the Martens hardness (universal hardness) is determined from the following formula. In the present Embodiment, the hardness when pressed with a load of 1 mN is adopted.

To further describe, the Martens hardness of the surface of the charging roller 5 is measured as following. In accordance with ISO 14577, the Martens hardness is measured using the surface coating film property tester (trade name: PICODENTOR HM500, manufactured by Helmut Fischer GmbH). The measurement of the Martens hardness is performed as 10 points, which are arbitrarily selected in a central portion in the longitudinal direction of the elastic layer of the charging roller 5, are set as measurement points. And an arithmetic mean value of values obtained from the measurements is used as a measured value of the Martens hardness of the surface of charging roller 5. Measuring conditions are shown below.

[Measuring Conditions]

Measuring indenter: Square pyramid indenter (angle 136°, Berkovich type)

Material of the indenter: Diamond

Measuring environment: Temperature 23° C., 50% RH

Loading speed and unloading speed: 1 mN/50 seconds

Maximum press-in load: 1 mN

A load-hardness curve is measured by applying the load at the rate described in the above conditions, and the Martens hardness at a time when the indentation depth of 0.1 μm is reached is calculated using the following formula.

Martens hardness $HM$ ($N/mm^2$)=$F$ (N)/surface area of the indenter under the testing load ($mm^2$) In the above formula, $F$ represents force.

—Surface Roughness—

Material which forms the surface (topmost surface, outer peripheral surface) of the charging roller 5 (material of the elastic layer and the surface layer) may contain spherical fine particles which form irregularities on the surface in order to give appropriate surface roughness to the surface of the charging roller. By making the material which forms the surface of the charging roller 5 contain the spherical fine particles, it becomes easier to make the surface roughness of the surface of the charging roller 5 uniform and to maintain a surface condition constant by reducing fluctuations in the surface roughness even when the surface is worn.

A volume-average particle diameter of the spherical fine particles is preferably 5 μm or more and 30 μm or less. For a measurement of the volume-average particle diameter of the fine particles, a laser diffraction particle size distribution analyzer (trade name: LS-230; manufactured by Coulter) with a liquid module mounted thereon can be used. For the measurement, a small amount of surfactant is added to approximately 10 cc of water, to which approximately 10 mg of fine particles are added, dispersed in an ultrasonic dispersion machine for 10 minutes, then the measurement is performed under conditions of 90 seconds for the measuring time and once for a number of measurements. A value measured by the above measuring method can be adopted as a value of the volume-average particle diameter.

In addition, with respect to 100 parts by mass of the resin which forms the surface of the charging roller 5 (e.g., polyester resin, polyurethane resin component), a content of the spherical fine particle is preferably 1 parts by mass or more and 100 parts by mass or less.

Examples of the spherical fine particles include urethane resin, polyester resin, polyether resin, acrylic resin, polycarbonate resin, polyethylene resin and nylon resin. These spherical fine particles can be produced, for example, by suspension polymerization or dispersion polymerization method.

From a viewpoint of suppressing the toner and the external additives to be solidly fixed to the surface of the charging roller 5 and a viewpoint of controlling the potential of the photosensitive drum 4, surface roughness Rz (ten point average roughness, JISB0601:1994, JISB0031:1994) of the surface of the charging roller 5 is preferably 0.1 μm or more and 25 μm or less, and more preferably 1.0 μm or more and 20 μm or less.

<Cleaning Roller>

Next, the cleaning roller 15 in the present Embodiment will be further described.

(Configuration of the Cleaning Roller)

The cleaning roller 15 is a cleaning member which cleans the charging roller 5 by being in contact with the charging roller 5. The cleaning roller 15 includes the elastic layer configured to contact the charging roller 5, and this elastic layer is the elastic foam layer constituted by the elastic form member. A surface (topmost surface, outer peripheral surface) of the cleaning roller 15 is formed by the elastic foam layer.

Examples of material for the elastic foam layer include, for example, material constituted by one type or two or more types of blending of foamable resin (such as polyurethane, polyethylene, polyamide or polypropylene), rubber material (such as silicone rubber, fluorine rubber, urethane rubber, EPDM (ethylene-propylene-diene rubber), NBR (acrylonitrile-butadiene copolymer rubber), CR (chloroprene rubber), chlorinated polyisoprene, isoprene, acrylonitrile-butadiene rubber, styrene-butadiene rubber, hydrogenated polybutadiene, butyl rubber). Incidentally, to these, if necessary, a coagent such as a foaming aid, a foam stabilizing agent, a catalyst, a curing agent, a plasticizer, or a vulcanization accelerator may be added.

For the material of the elastic foam layer, especially, polyurethane foam which has high tensile strength is preferable from a viewpoint of not scratching the surface of the cleaned member (the charging roller 5) due to rubbing and not being shredded or broken over a long period of time. Examples of polyurethane include, for example, a reaction product of polyol (for example, polyester polyol, polyether polyol, polyester, acrylic polyol, etc.) and isocyanate (for example, 2,4-tolylene diisocyanate, 2,6-tolylene diisocyanate, 4,4-diphenylmethane diisocyanate, tolylene diisocyanate, 1,6-hexamethylene diisocyanate, etc.), and may contain a chain extender (1,4-butanediol, trimethylol propane).

Foaming of the polyurethane is generally performed using, for example, a foaming agent such as water or an azo compound (e.g., azodicarbonamide, azobisisobutyronitrile, etc.). To the polyurethane form, a coagent such as a foaming aid, a foam stabilizing agent and a catalyst may be added.

Here, contact pressure of the cleaning roller 15 against the charging roller 5 is preferably 40 mN/mm or less. In other words, when the cleaning roller 15 is brought into contact with the charging roller 5 at the contact pressure exceeding 40 mN/mm, the charging roller 5 is braked by receiving the contact pressure from the cleaning roller 15. As a result, the charging roller 5 will not rotate, which may result in an occurrence of charging defect of the photosensitive drum 4.

From this perspective, the contact pressure of the cleaning roller 15 against the charging roller 5 is preferably 40 mN/mm or less, and more preferably 20 mN/mm or less. On the other hand, in order to remove the contamination of the charging roller 5, the contact pressure of the cleaning roller 15 against the charging roller 5 is preferably 0.5 mN/mm or more. In other words, if the contact pressure of the cleaning roller 15 against the charging roller 5 is smaller than the above value, there is a possibility that the removing effect of the contamination of the charging roller 5 by the cleaning roller 15 cannot be obtained sufficiently. From this perspective, the contact pressure of the cleaning roller 15 against the charging roller 5 is preferably 0.5 mN/mm or more, and more preferably 1.0 mN/mm or more. In the present Embodiment, the cleaning roller 15 is configured to be in contact with the charging roller 5 at the contact pressure of 20 mN/mm and is rotated with the rotation of the charging roller 5. Incidentally, the contact pressure of the cleaning roller 15 against the charging roller 5 is expressed in terms of contact weight (mN) per unit length (1 mm) in the longitudinal direction of the charging roller 5.

(Storage Elastic Modulus)

As described above, in the present Embodiment, the image forming apparatus 100 is configured so that the storage elastic modulus E'C of the surface (topmost surface, outer peripheral surface) of the charging roller 5 and the storage elastic modulus E'CC of the elastic foam layer of the cleaning roller 15 satisfy the relationship of E'C>E'CC. By this, it becomes possible to clean the external additives on the surface of the charging roller 5 effectively by the cleaning roller 15 gathering the external additives adhered on the surface of the charging roller 5 in the lump-shape, lifting the external additives off the surface of the charging roller 5, and returning the external additives to the photosensitive drum 4.

In the present Embodiment, the storage elastic modulus E'CC of the elastic foam layer of the cleaning roller 15 is measured to determine hardness of a base material (matrix material) which constitutes the elastic form member of the elastic foam layer of the cleaning roller 15. In the present Embodiment, in order to measure the storage elastic modulus E'CC of the elastic foam layer of the cleaning roller 15, the following method is used.

The elastic foam layer portion (urethane sponge) of the cleaning roller 15 is made into powder by being frozen in liquid nitrogen and pulverized, and a sample is made by pressing and hardening this powder into a pellet-shape having a diameter of 10 mm and a thickness of 5 mm with applying a load of about 5.0 N. And the storage elastic modulus (E') of this sample is measured. The storage elastic modulus (E') is measured by using the same device which is used to measure the storage elastic modulus E'C of the surface of the charging roller 5 under substantially the same conditions.

The storage elastic modulus E'C of the surface of the charging roller 5 described above is a parameter which represents "hardness of rubber". On the other hand, the storage elastic modulus E'CC of the elastic foam layer of the cleaning roller 15 is a parameter which represents "hardness of the matrix material which constitutes the foam member". By using the storage elastic modulus (E') in this manner, it becomes possible to compare the surface of the charging roller 5 and the elastic foam layer of the cleaning roller 15 with respect to the physical adhesive force.

(Method for Manufacturing the Cleaning Roller)

Next, an example of a method for manufacturing the cleaning roller 15 in the present Embodiment will be described.

First, polyurethane foam member is produced. For example, polyether polyol is used as polyols, and water as a forming agent, triethylenediamine and tin octanoate as catalysts and melamine powder are added to and mixed with the polyether polyol, then tolylene diisocyanate is blended as polyisocyanates, and the polyurethane foam member is prepared by being foamed. The resulting polyurethane foam member is cut into a plate-shape, and a hole for inserting the core metal (rotation shaft) 15*a* of the cleaning roller 15 is opened. The core metal 15*a* of the cleaning roller 15 is then inserted into the hole, solidly fixed, and an outer peripheral surface thereof is polished to produce the cleaning roller 15.

In the present Embodiment, as polyols, polyether polyol with an average molecular weight of 3000, which is an addition polymerization of propylene oxide to glycerin, (trade name: Caradol 56-16, made by Shell) is used. To this 100 g of polyether polyol, 4.0 g of water as a foaming agent, 0.1 g of triethylenediamine and 0.23 g of tin octanoate (stannous octoate) as catalysts, and 30 g of melamine powder (made by Mitsui Chemicals Inc., mean particle diameter 1 to 10 μm) are added, and after stirring with a mixer for 5 minutes, 51.3 g of tolylene diisocyanate (trade name: TDI-80, made by Nippon Polyurethane Industry Co., Ltd.) is added and stirred for 7 seconds to obtain a mixed solution.

TDI-80 is a mixture of 80 mass % of 2,4-tolylene diisocyanate and 20 mass % of 2,6-tolylene diisocyanate. In addition, isocyanate index is set to 108.

Then, the above mixture is quickly put into a polyethylene bag with 30 cm in a vertical length and 30 cm in a horizontal length, and foamed to obtain polyurethane foam member. A content of the melamine powder in the polyurethane foam member is 16.5 mass % (={30/(100+51.3+30)}×100). The obtained polyurethane foam member had a mean cell diameter of 400 to 600 μm according to JIS K6400 and density of 50 kg/m$^3$.

After foaming, the polyethylene bag is peeled off and the polyurethane foam is cut into a plate-shape with a thickness of 18 mm. Next, a hole of 4 mm in diameter is opened as the hole for inserting the core metal 15*a* of the cleaning roller 15. On the other hand, the core metal 15*a* made of steel, which has been subjected to an electroless nickel plating treatment, is prepared, and ethylene-vinyl-acetate-based hot melt adhesive is applied to a surface thereof to a thickness of about 100 μm. This core metal 15*a* is inserted into the above hole in the polyurethane foam member, and after induction heating, the core metal 15*a* is cooled and fixed in the polyurethane foam member. And the outer peripheral surface of the polyurethane foam member is polished to produce the cleaning roller 15 with an outer diameter of 6 mm.

EXAMPLES/COMPARATIVE EXAMPLES

Next, effects of the present Embodiment will be further described using Examples (Examples 1 through 4), which follows the present Embodiment and Comparative Examples (Comparative Examples 1 and 2) for comparison to the Examples. Incidentally, as for the Comparative Examples as well, elements having the corresponding functions and configurations to those of the present Embodiment are marked with the same reference numeral.

—Production of the Charging Roller—

A method for producing a charging roller 5 in an Example 1 will be described.

Each material of a type and an amount shown in Table 1 is mixed in a pressurized kneader to obtain an unvulcanized domain composition (1).

TABLE 1

Raw material for the unvulcanized domain composition (1)

| | Name of raw material | Blending amount (Parts by mass) |
|---|---|---|
| Raw material rubber | NBR (Trade name: JSR NBR N230S, made by JSR Corporation) | 100 |
| Electroconductive agent | Carbon black (Trade name: TOKABLACK #5500, made by Tokai Carbon Co., LTD.) | 60 |
| Vulcanization accelerating aid | Zinc oxide (Trade name: Zinc oxide, made by Sakai Chemical Industry Co., LTD.) | 5 |
| Processing aid | Zinc stearate (Trade name: SZ-2000, made by Sakai Chemical Industry Co., LTD.) | 2 |

In addition, each material of a type and an amount shown in Table 2 is mixed in the pressurized kneader to obtain an unvulcanized rubber composition (1).

TABLE 2

Raw material for the unvulcanized rubber composition (1)

| | Name of raw material | Blending amount (Parts by mass) |
|---|---|---|
| Raw material rubber | The unvulcanized domain composition (1) | 30 |
| Raw material rubber | SBR (Trade name: Asaprene 303, made by Asahi Kasei Corporation) | 70 |
| Filler | Calcium carbonate (Trade name: Nanox #30, made by Maruo Calcium Co., LTD.) | 40 |
| Vulcanization accelerating aid | Zinc oxide (Trade name: Zinc oxide, made by Sakai Chemical Industry Co., LTD.) | 5 |
| Processing aid | Zinc stearate (Trade name: SZ-2000, made by Sakai Chemical Industry Co., LTD.) | 2 |

In addition, each material of a type and an amount shown in Table 3 is mixed by an open roll to prepare a rubber composition for molding the elastic layer (1).

TABLE 3

Rubber composition for molding the elastic layer (1)

| | Name of raw material | Blending amount (Parts by mass) |
|---|---|---|
| Raw material rubber | The unvulcanized rubber composition (1) | 100 |
| Vulcanizing agent | Dispersible sulfur (Trade name: SULFAX 200S, sulfur content 99.5%, made by Tsurumi Chemical Industry Co., LTD.) | 3 |
| Vulcanization accelerator 1 | Tetrabenzylthiuram disulfide (Trade name: SANCELER TBZTD, made by Sanshin Chemical Industry Co., LTD.) | 2 |
| Vulcanization accelerator 2 | N-Cyclohexylbenzothiazole-2-sulfenamide (Trade name: NOCCELER CZ-G, made by Ouchi Shinko Chemical Industrial Co., LTD.) | 0.5 |

An around bar with a total length of 252 mm and an outer diameter of 6 mm of free-cutting steel, of which a surface is subjected to electroless nickel plating, is prepared. Next, using a roll coater, METALOC U-20 (trade name, manufactured by Toyokagaku Kenkyusho Co., Ltd.) is applied as an adhesive over an entire periphery in a range of 230 mm of the above round bar, which excludes each 11 mm of both end portions thereof. The round bar coated with the above adhesive is used as the core metal (conductive supporting member) 5*a* of the charging roller 5.

Next, a die with an inner diameter of 12.5 mm is attached to a tip of a crosshead extruder which has a supplying mechanism of the core metal 5*a* and a discharging mechanism of an unvulcanized rubber roller, temperature of an extruder and a crosshead are set to 80° C., and a transporting speed of a conductive mandrel is adjusted to 60 mm/sec. Under these conditions, the rubber composition for molding the elastic layer (1) including the unvulcanized rubber composition (1) is supplied from the extruder, and the outer peripheral surface of the core metal 5*a* is covered by the rubber composition for molding the elastic layer (1) in the crosshead to obtain the unvulcanized rubber roller (1).

Next, the above unvulcanized rubber roller (1) is put into a hot air vulcanizing furnace at 170° C., and the unvulcanized rubber composition (1) of the rubber composition for molding the elastic layer (1) is vulcanized by heating for 60 minutes to obtain a roller of which the elastic layer is formed on the outer peripheral surface of the core metal 5*a*. After that, both end portions of the elastic layer are cut off by 10 mm, respectively, to set a length of the elastic layer in a longitudinal direction to be 231 mm.

Finally, the surface of the elastic layer is polished with a rotary grindstone. As a result, an elastic layer roller (1) of which a crown amount is 80 μm, each diameter is 8.42 mm at positions of 90 mm from a central portion to both end portion sides in the longitudinal direction and a diameter of the central portion in the longitudinal direction is 8.5 mm is obtained.

After that, a surface of the above elastic layer roller (1) is subjected to a treatment by irradiating the surface of the elastic layer roller (1) with ultraviolet light of 254 nm wavelength so that an integrated light amount is 9000 $mJ/cm^2$. As a UV light source, a low-pressure mercury lamp (manufactured by Toshiba Lighting & Technology Corporation) is used. In this manner, the charging roller (1) of the Example 1 is made.

—Production of the Cleaning Roller—

A method for producing the cleaning roller 15 of the Example 1 is the same as the method described as an example of the method for manufacturing the cleaning roller 15 in the present Embodiment described above.

—Production of the Charging Roller—

A method for producing a charging roller 5 in an Example 2 will be described.

The charging roller (2) of the Example 2 is produced by forming a surface layer (1) on the above elastic layer roller (1) by the following procedure.

An applying liquid for the surface layer (1) to form the surface layer (1) is prepared as following.

Acrylic polyol (trade name: DC2016, made by Daicel Chemical Industries, Ltd.) 100.0 parts by mass, isocyanate A (trade name: VESTANAT B1370, made by Degussa) 14 parts by mass, isocyanate B (trade name: DURANATE TPA-B80E, made by Asahi Kasei Chemicals, Ltd.) 80 parts by mass, carbon black (trade name: MA230, made by Mitsubishi Chemical Corporation, number mean particle diameter 30 nm) 35 parts by mass, and ether modified dimethyl silicone oil (trade name: SH-28PA, made by Toray Dow Corning Silicone) 0.25 parts by mass are dissolved in methyl ethyl ketone (MEK) and adjusted so that a solid content becomes 25 mass % to prepare a liquid mixture (1). In a glass bottle with a content of 450 mL, 270 g of the above liquid mixture (1) and 200 g of glass beads with a mean particle diameter of 0.8 mm are put and dispersed for 24 hours using a paint shaker disperser.

After dispersing as described above, 30 parts by mass of acrylic particles with a mean particle diameter of 10.0 μm (trade name: GANZPEARL GM-1001, made by Aica Kogyo Co., Ltd.) is added. After that, further dispersed for 25 minutes, the glass beads are removed to obtain the applying solution for the surface layer (1).

An elastic roller (1) is dipped in the applying solution for the surface layer (1) with a longitudinal direction thereof in a vertical direction and an upper end portion thereof gripped, and then pulled up. A dipping time for the above dipping-application is 9 seconds, and a pulling-up speed of the roller is adjusted so that an initial speed is 20 mm/sec and a final speed is 12 mm/sec, and from 20 mm/sec to 12 mm/sec, the speed is changed linearly with time. After the application, the elastic roller (1) is air-dried at temperature of 23° C. for 30 minutes. Next, in a hot air circulation dryer, the elastic roller (1) is dried at temperature of 80° C. for 1 hour and dried at temperature of 160° C. for 1 hour to form a dried film of the applied film of the applying solution for the surface layer (1) on the elastic layer roller (1), thereby producing the charging roller (2) in the Example 2. Incidentally, a mean film thickness of the surface layer is 25 μm.

—Production of the Cleaning Roller—

A method for producing the cleaning roller 15 of the Example 2 is the same as the method described as an example of the method for manufacturing the cleaning roller 15 in the present Embodiment described above.

—Production of the Charging Roller—

A method for producing a charging roller 5 in an Example 3 and an Example 4 will be described.

In the Example 3, when preparing the applying solution for the surface layer (1) described in the method for producing the charging roller 5 in the Example 2, by reducing the addition amount of the carbon black (product name: MA230, made by Mitsubishi Chemical Corporation, number mean particle diameter 30 nm) from 35 parts by mass in the Example 2, the Martens hardness of a surface of the charging roller 5 is adjusted to be 15.0 N/mm$^2$. In the Example 4, similarly, when preparing the applying solution for the surface layer (1), by reducing the addition amount of the carbon black (product name: MA230, made by Mitsubishi Chemical Corporation, number mean particle diameter 30 nm) from 35 parts by mass in the Example 2, the Martens hardness of a surface of the charging roller 5 is adjusted to be 10.0 N/mm$^2$. Other aspects of the method for producing the charging roller 5 in the Example 3 and the Example 4 are the same as the method for producing the charging roller 5 in the Example 2.

—Production of the Cleaning Roller—

The method for producing a cleaning roller 15 in the Example 3 and the Example 4 is the same as the method described as an example of the method for manufacturing the cleaning roller 15 in the present Embodiment described above.

—Production of the Charging Roller—

A method for producing a charging roller 5 in a Comparative Example 1 and a Comparative Example 2 will be described.

The charging roller (3) in the Comparative Example 1 and the Comparative Example 2 is produced by the same procedure as the charging roller (1), except that the unvulcanized rubber composition (1) is changed to an unvulcanized rubber composition (2) shown below.

Each material of a type and an amount shown in Table 4 is mixed in a pressurized kneader to obtain the unvulcanized rubber composition (2).

TABLE 4

Raw material for the unvulcanized rubber composition (2)

| | Name of raw material | |
|---|---|---|
| Raw material rubber | NBR (Trade name: JSR NBR N230S, manufactured by JSR Corporation) | 100 |
| Electroconductive agent | Carbon black (Product name: EC600JD, made by Ketjen Black International Company) | 10 |
| Filler | Calcium carbonate (Trade name: Nanox #30, made by Maruo Calcium Co., LTD.) | 40 |
| Vulcanization accelerating aid | Zinc oxide (Trade name: Zinc oxide, made by Sakai Chemical Industry Co., LTD.) | 5 |
| Processing aid | Zinc stearate (Trade name: SZ-2000, made by Sakai Chemical Industry Co., LTD.) | 2 |

—Production of the Cleaning Roller—

A method for producing a cleaning roller 15 in the Comparative Example 1 and the Comparative Example 2 will be described.

In the Comparative Example 1, by configuring an addition amount of tolylene diisocyanate relative to 100 g of the polyether polyol described above to be more than 51.3 g in the Examples 1 through 4, the polyurethane foam member is adjusted so that the storage elastic modulus of the elastic foam layer is 30 MPa. In the Comparative Example 2, similarly, by configuring the addition amount of tolylene diisocyanate relative to 100 g of the polyether polyol to be more than 51.3 g in the Examples 1 through 4, the polyurethane foam is adjusted so that the storage elastic modulus of the elastic foam layer is 20 MPa. Other aspects of the method for producing the cleaning roller 15 of the Comparative Example 1 and the Comparative Example 2 are the same as what is described as an example of the method for manufacturing the cleaning roller 15 in the present Embodiment described above.

(Confirmation of Effectiveness)

For the Examples (Examples 1 through 4) and the Comparative Examples (Comparative Examples 1 and 2), evaluation experiments were conducted to confirm the removing effect of the contamination on the charging roller 5 with the cleaning roller 15. The evaluation experiments were conducted using a laser beam printer manufactured by Hewlett-Packard Company (HP LaserJet Enterprise M612dn, 71 ppm (A4)). Hereinafter, the evaluation experiment will be described.

First, a new process cartridge C incorporating the charging roller 5 and the cleaning roller 15 of the Examples (Examples 1 through 4) and the Comparative Examples (Comparative Examples 1 and 2), respectively, is mounted to the image forming apparatus 100, and a horizontal line image (straight lines perpendicular to the conveyance direction of the recording material P) with a print ratio of about 2% is printed on 10,000 sheets. After that, one uniform halftone image with a print ratio of about 30% is printed as a sample image. If, in the halftone image, a streak occurs in an image conveyance direction, the following observation of the charging roller 5 is performed. If there is no problem on the image, another 10,000 sheets are printed, and the process is repeated until a total number of printed sheets reaches 60,000 sheets. The paper passing tests as described above (printing of the horizontal line images and the sample image) were conducted in an environment of 23° C. and 50% RH. The characteristics of the charging roller 5 and the cleaning roller 15 in the Examples (Examples 1 through 4) and the Comparative Examples (Comparative Examples 1 and 2) are shown in Table 5.

TABLE 5

| | Configuration of the charging roller | Storage elastic modulus of the topmost surface of the charging roller E'C | Storage elastic modulus of the elastic layer of the cleaning roller E'CC | Martens hardness of the topmost surface of the charging roller | Surface roughness Rz of the topmost surface of the charging roller |
|---|---|---|---|---|---|
| Example 1 | Elastic layer only | 20 MPa | 10 MPa | 2.1 N/mm$^2$ | 5 μm |
| Example 2 | The elastic layer and the surface layer | 2000 MPa | 10 MPa | 25.0 N/mm$^2$ | 15 μm |
| Example 3 | The elastic layer and the surface layer | 2000 MPa | 10 MPa | 15.0 N/mm$^2$ | 15 μm |
| Example 4 | The elastic layer and the surface layer | 2000 MPa | 10 MPa | 10.0 N/mm$^2$ | 15 μm |
| Comparative Example 1 | Elastic layer only | 10 MPa | 30 MPa | 2.0 N/mm$^2$ | 10 μm |
| Comparative Example 2 | Elastic layer only | 10 MPa | 20 MPa | 2.0 N/mm$^2$ | 10 μm |

Evaluation criteria are defined as following. Observation of the surface of the charging roller 5 after the paper passing test showed that, on the surface of the charging roller 5 in the configuration in which the streak occurred on the image, adhesion of the external additives is observed corresponding to a streak occurring portion. For such configurations, evaluation results are determined as "x (poor)".

In addition, even in the configuration in which no streaking occurred on the image, when the surface of the charging roller 5 was observed after the paper passing test, there were some cases in which the adhesion of the external additives in the streak-shape was observed on the surface of the charging roller 5, although an amount of adhesion was less than that of those in which the streak occurred on the image. For such configurations, the evaluation results are determined as "Δ (Good)".

In addition, for the configuration in which no streak occurred on the image and no external additives adhered to the surface of the charging roller 5 even when the surface of the charging roller 5 was observed after the paper passing test, the evaluation results are determined as "○ (Excellent)".

Here, the configurations in which no contamination of the charging roller 5 occurs or a level of occurrence is suppressed to "Δ" up to 50,000 sheets are defined as configurations in which the removing effect of the contamination of the charging roller 5 by the cleaning roller 15 is maintained for a longer period of time and a longer service life is achieved.

The evaluation results are shown in Table 6.

TABLE 6

| | Number of passed sheets (×1000) | | | | | |
|---|---|---|---|---|---|---|
| | 10 | 20 | 30 | 40 | 50 | 60 |
| Example 1 | ○ | ○ | ○ | ○ | Δ | x |
| Example 2 | ○ | ○ | ○ | ○ | ○ | ○ |
| Example 3 | ○ | ○ | ○ | ○ | ○ | Δ |
| Example 4 | ○ | ○ | ○ | ○ | Δ | x |
| Comparative Example 1 | ○ | ○ | x | x | x | x |
| Comparative Example 2 | ○ | ○ | ○ | x | x | x |

As shown in Table 6, in the Comparative Example 1, no contamination of the charging roller 5 occurred up to 20,000 sheets ("○" level), however, the contamination of the charging roller 5 occurred at the "x" level at 30,000 sheets. In addition, in the Comparative Example 2, no contamination of the charging roller 5 occurred up to 30,000 sheets ("○" level), however, the contamination of the charging roller 5 occurred at the "x" level at 40,000 sheets.

In contrast, in the Example 1, no contamination of the charging roller 5 occurred up to 40,000 sheets ("○" level). However, in the Example 1, the contamination of the charging roller 5 occurred at the "Δ" level at 50,000 sheets and the contamination of the charging roller 5 occurred at the "x" level at 60,000 sheets.

In addition, in the Example 2, no contamination of the charging roller 5 occurred throughout the experiment ("○" level). In addition, in the Example 3, no contamination of the charging roller 5 occurred up to 50,000 sheets ("○" level), however, the contamination of the charging roller 5 occurred at the "Δ" level at 60,000 sheets. Furthermore, in the Example 4, no contamination of the charging roller 5 occurred up to 40,000 sheets ("○" level), however, the contamination of the charging roller 5 occurred at the "Δ" level at 50,000 sheets and the contamination of the charging roller 5 occurred at the "x" level at 60,000 sheets.

Hereinafter, a mechanism of the occurrence of the contamination of the charging roller 5 and a removing mechanism of the contamination of the charging roller 5 will be described by comparing the Comparative Examples (Comparative Examples 1 and 2) and the Examples (Examples 1 through 4).

(Contamination of the Charging Roller in the Comparative Examples 1 and 2)

First, a mechanism of the occurrence of the contamination of the charging roller 5 in the Comparative Examples 1 and 2 will be described using FIG. 9 through FIG. 11. Here, in particular, a mechanism by which it becomes difficult to remove the external additives in the Comparative Examples 1 and 2 will be described. As to the toner as well, it can become difficult to be removed by the same mechanism.

Figure 9:
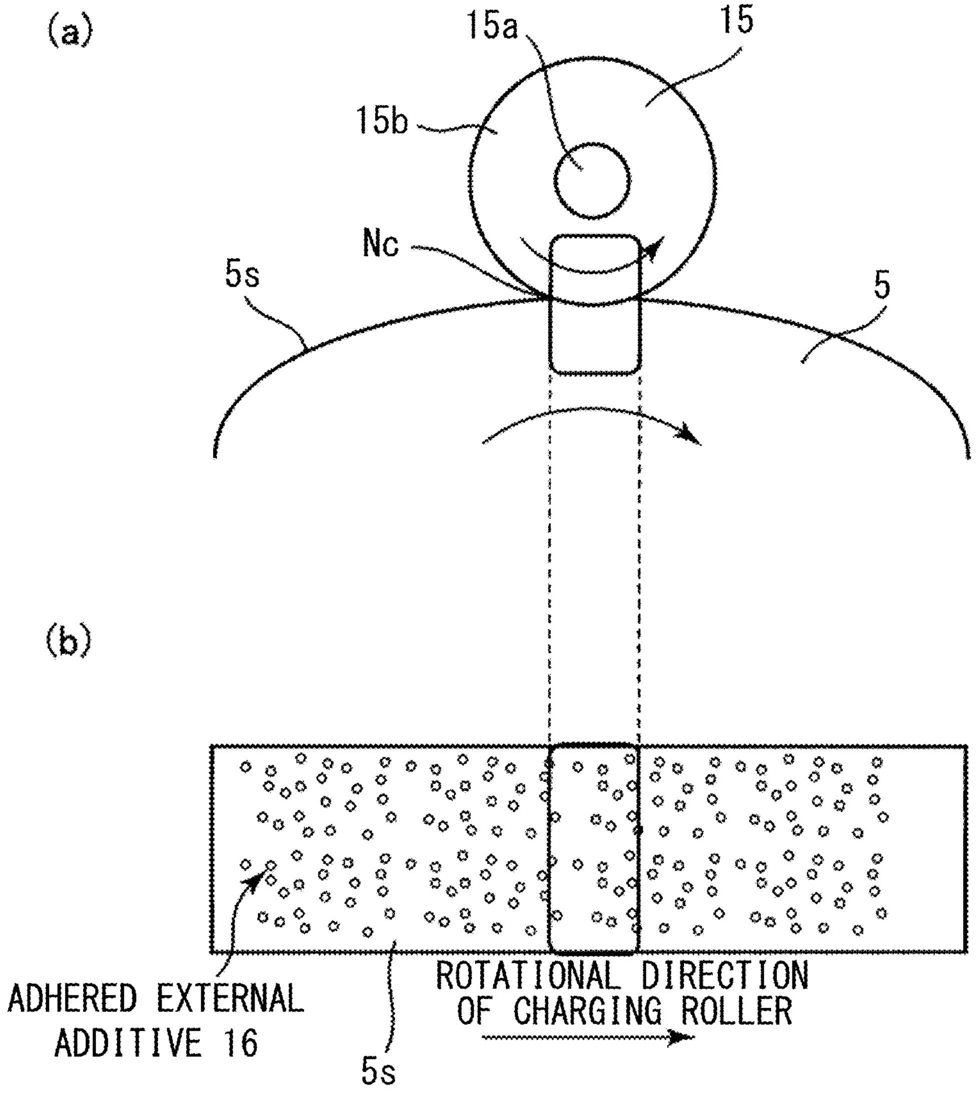
Fig. 9 Prior Art
FIG. 9, part (a) and part (b), is a schematic view illustrating an adhering state of the external additives according to Comparative Examples 1 and 2.

Part (a) of FIG. 9 is a schematic view illustrating positional relationship between the cleaning roller 15 and the charging roller 5 in the Comparative Example 1, and part (b) of FIG. 9 is a schematic view for describing an adhering state of the external additives on the surface of the charging roller 5. In the Comparative Example 1, a significant change cannot be seen in external additives 16 adhered to a surface 5*s* of the charging roller 5 after passing through a contacting portion (cleaning nip) Nc between the cleaning roller 15 and the charging roller 5, and the external additives 16 are in a state being difficult to be removed.

Figure 10:
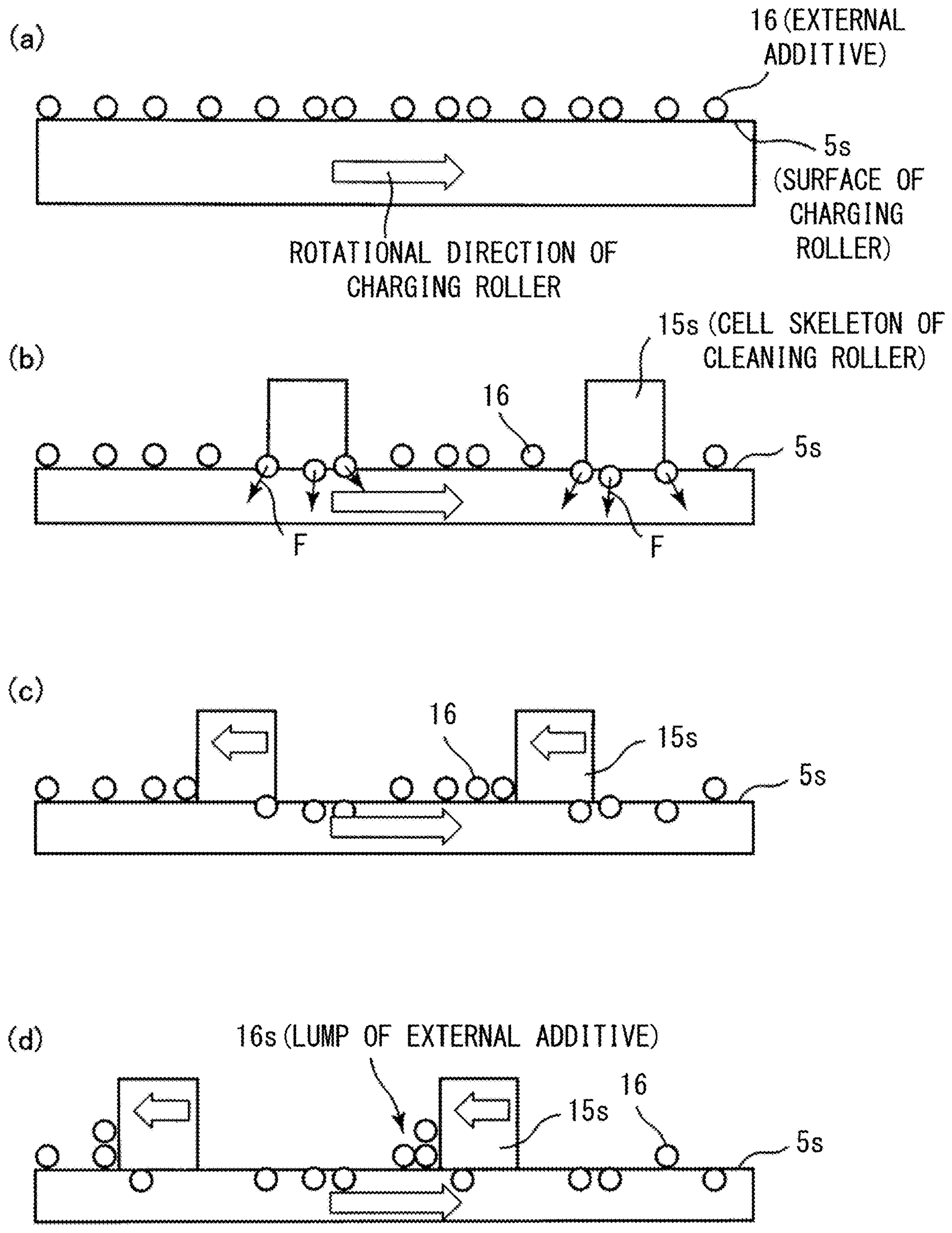
Fig. 10 Prior Art
FIG. 10, part (a), part (b), part (c) and part (d), is a schematic view for describing an adhering mechanism of the external additives according to the Comparative Examples 1 and 2.
Figure 11:
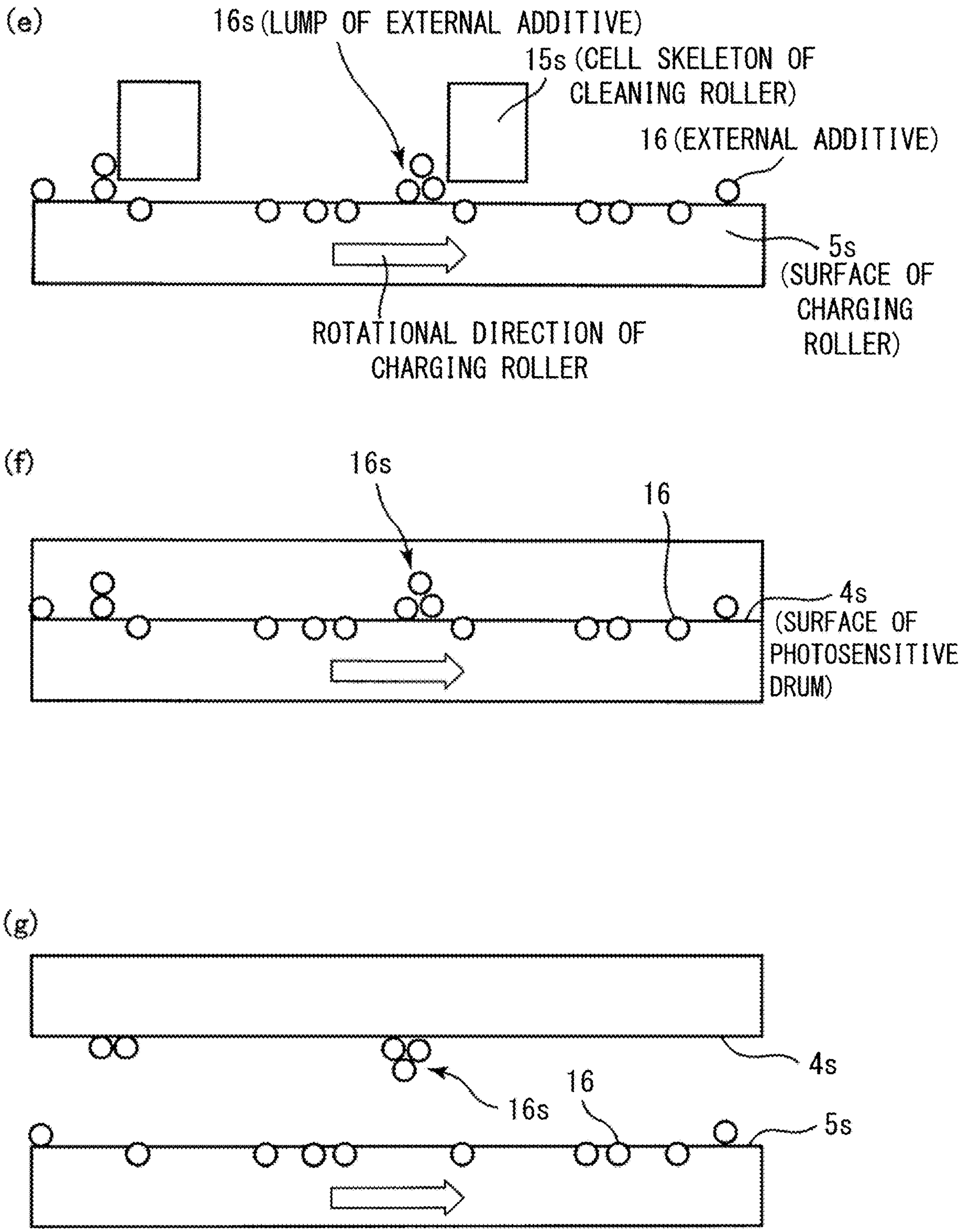
Fig. 11 Prior Art
FIG. 11, part (e), part (f) and part (g), is a schematic view for describing the adhering mechanism of the external additives according to the Comparative Examples 1 and 2.

FIG. 10 and FIG. 11 are schematic views for describing the mechanism by which it becomes difficult for the cleaning roller 15 to remove the external additives of the surface 5*s* of the charging roller 5 in the Comparative Example 1. Incidentally, FIG. 10 and FIG. 11 are schematically illustrating cross-sectional views approximately perpendicular to the rotational axis direction of the charging roller 5 in a vicinity of the surface of the charging roller 5, and for the sake of illustrating the above mechanism, there is a case that the external additives adhered to the surface of the charging roller 5 and to the surface of the photosensitive drum 4 may be illustrated inside of the surface.

The external additive 16 which has slipped through the cleaning blade 6 adhere electrostatically or non-electrostatically to the surface 5*s* of the charging roller 5 at a contacting portion between the charging roller 5 and the photosensitive drum 4 (a state illustrated in part (a) of FIG. 10).

The external additive 16 adhered to the surface 5*s* of the charging roller 5 is carried to the contacting portion Nc between the cleaning roller 15 (more specifically, a cell skeleton 15*s* of the elastic foam layer 15*b* made of urethane sponge) and the surface 5*s* of the charging roller 5. In the contacting portion Nc between the surface 5*s* of the charging roller 5 and the cleaning roller 15, the external additive 16 has higher adhesive force to the charging roller 5 than to the cleaning roller 15. This is because, in the Comparative Example 1, the storage elastic modulus E'C of the surface of the charging roller 5 and the storage elastic modulus E'CC of the elastic foam layer of the cleaning roller 15 are in relationship of E'C<E'CC. As a result, force in directions of arrows F in part (b) of FIG. 10 (direction from the cleaning roller 15 toward the charging roller 5) acts on the external additives 16. This is because of a characteristic that in a state in which the storage elastic modulus (E') is lower, the physical adhesive force becomes stronger, and in a state in which the storage elastic modulus (E') is higher, the physical adhesive force becomes weaker. In other words, when the charging roller 5 and the cleaning roller 15, which have the different storage elastic modulus (E'), come into contact with the external additive 16, the charging roller 5 with the lower storage elastic modulus (E') has the higher adhesive force with the external additive 16. Therefore, the external additive 16 becomes less likely to move from the charging roller 5 to the cleaning roller 15 (a state illustrated in part (b) of FIG. 10).

The cleaning roller 15 is rotated with the rotation of the charging roller 5. Therefore, the cleaning roller 15 is rotated slightly behind the charging roller 5 (a state illustrated in part (c) of FIG. 10).

As the charging roller 5 rotates further, the cleaning roller 15 also is rotated while slightly behind as described above. As a result, some of the external additives 16 adhered to the surface 5*s* of the charging roller 5 are moved so as to be gathered by the cell skeleton 15*s* of the cleaning roller 15, and a few lumps 16*s* of the external additives 16 are foamed. On the other hand, most of the external additives 16 adhered to the surface 5*s* of the charging roller 5 go under the cell skeleton 15*s* of the cleaning roller 15 due to the contact with the cell skeleton 15*s* of the cleaning roller 15, and adhered firmly to the surface 5*s* of the charging roller 5 (a state illustrated in part (d) of FIG. 10).

Next, by the surface 5*s* of the charging roller 5 exiting the contacting portion Nc with the cleaning roller 15, there is no longer the contact pressure by the cleaning roller 15 and a shape thereof returns to an original shape. At this time, on the surface 5*s* of the charging roller 5, the few lumps 16*s* of the external additives 16 formed by the cell skeleton 15*s* of the cleaning roller 15 remain (a state illustrated in part (e) of FIG. 11).

After that, the lumps 16*s* of the external additives 16 on the charging roller 5 are carried to the contacting portion between the charging roller 5 and the photosensitive drum 4 while remaining adhered to the surface of the charging roller 5 (a state illustrated in part (f) of FIG. 11).

Then, some of the lumps 16*s* of the external additives 16 on the charging roller 5 move from the surface 5*s* of the charging roller 5 to a surface 4*s* of the photosensitive drum 4 and adhere thereto. On the other hand, most of the external additives 16 are firmly adhered to the surface 5*s* of the charging roller 5 and do not move to the surface 4*s* of the photosensitive drum 4 (a state illustrated in part (g) of FIG. 11).

As described above, in the Comparative Example 1, the storage elastic modulus E'C of the surface of the charging roller 5 and the storage elastic modulus E'CC of the elastic foam layer of the cleaning roller 15 are in the relationship of E'C<E'CC. As a result, the external additive 16 adhered to the surface 5*s* of the charging roller 5 has the higher adhesive force to the charging roller 5 than to the cleaning roller 15. Therefore, it becomes difficult for the cleaning roller 15 to remove the external additive 16 adhered to the surface 5*s* of the charging roller 5. In this case, the external additives will accumulate on the surface of the charging roller 5 due to a long term use of the process cartridge C, which may cause the charging defect in the photosensitive drum 4 due to the contamination of the charging roller 5. In other words, it can be a factor inhibiting an extended service life of the process cartridge C.

In the Comparative Example 2, as in the Comparative Example 1, the storage elastic modulus E'C of the surface of the charging roller 5 and the storage elastic modulus E'CC of the elastic foam layer of the cleaning roller 15 are in the relationship of E'C<E'CC. However, in the Comparative Example 2, difference between the E'C and the E'CC is smaller than in the Comparative Example 1. As a result, in the Comparative Example 2, the action to form the lump 16*s* of the external additives 16 on the surface 5*s* of the charging roller 5 and an action to vigorously flick and lift this lump 16*s* work more than in the Comparative Example 1. As a result, in the Comparative Example 2, it is considered that the removing effect of the contamination of the charging roller 5 by the cleaning roller 15 becomes slightly better than in the Comparative Example 1.

(Removal of the Contamination of the Charging Roller in the Examples 1 Through 4)

Next, using FIG. 4 through FIG. 8, the removing mechanism of the contamination of the charging roller 5 in the Examples 1 through 4 will be described. Here, in particular, a mechanism by which it becomes easier to remove the external additives in the Examples 1 through 4 will be described. As to the toner as well, it can become easier to be removed by the same mechanism.

Figure 4:
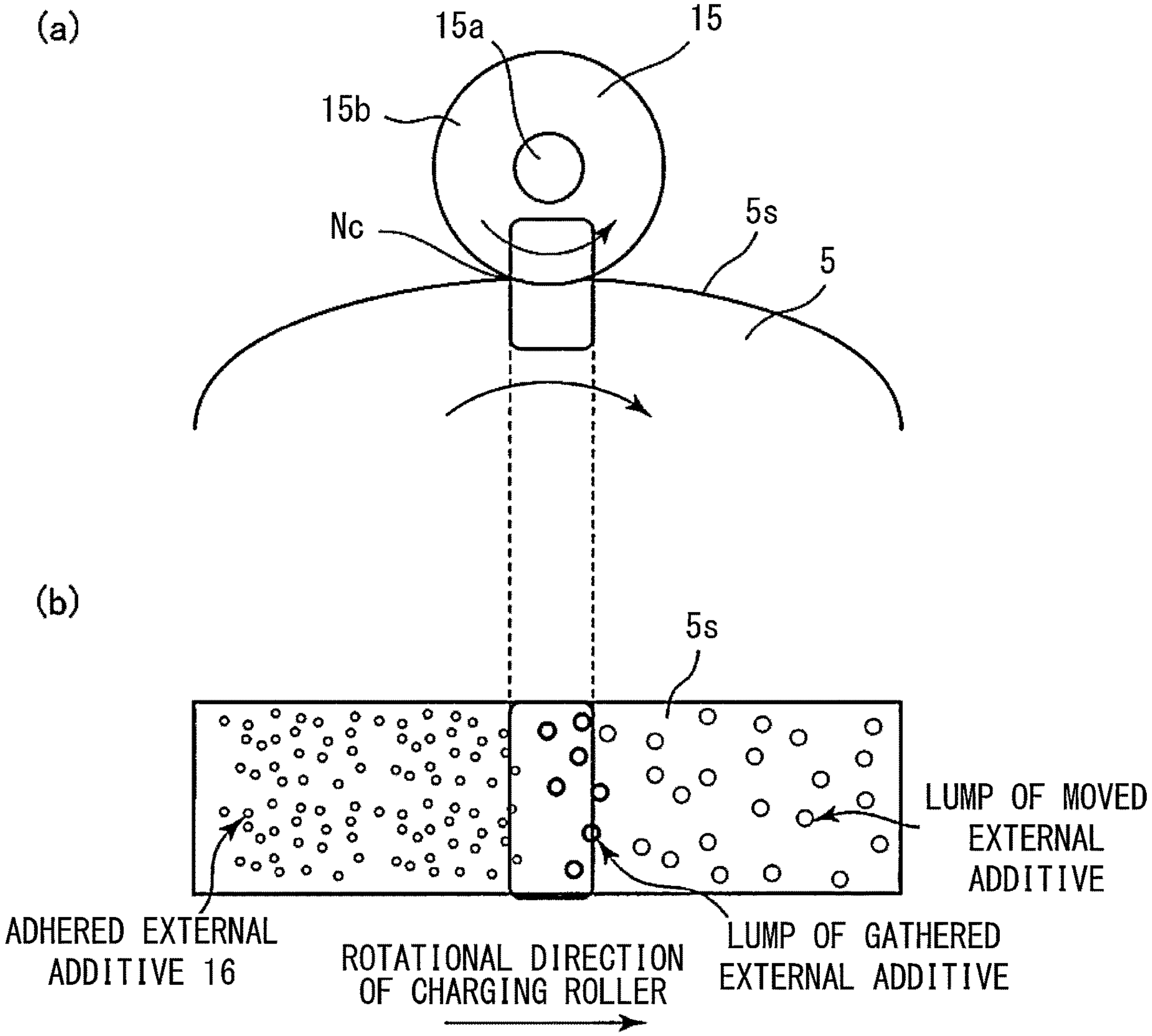
FIG. 4, part (a) and part (b), is a schematic view illustrating an adhering state of external additives according to an Example 1.

Part (a) of FIG. 4 is a schematic view illustrating positional relationship between the cleaning roller 15 and the charging roller 5 in the Example 1, and part (b) of FIG. 4 is a schematic diagram for describing an adhering state of the external additives on the surface of the charging roller 5. In the Example 1, the external additives 16 adhered to the surface 5$s$ of the charging roller 5 are collected in the lump-shape and are in a state being easy to be removed in the contacting portion (cleaning nip) Nc between the cleaning roller 15 and the charging roller 5.

Figure 5:
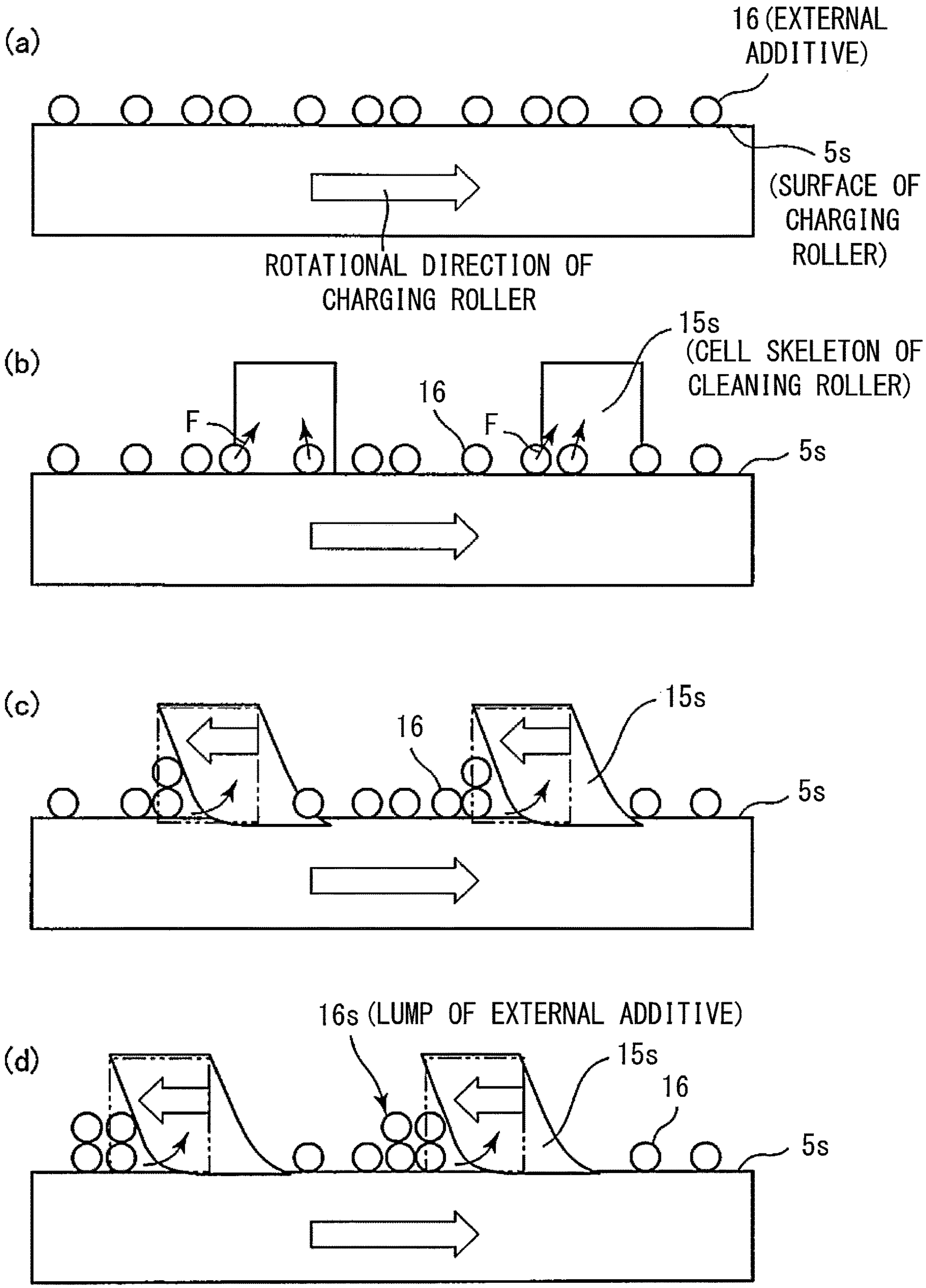
FIG. 5, part (a), part (b), part (c) and part (d), is a schematic view for describing a removing mechanism for the external additive according to the Example 1.
Figure 6:
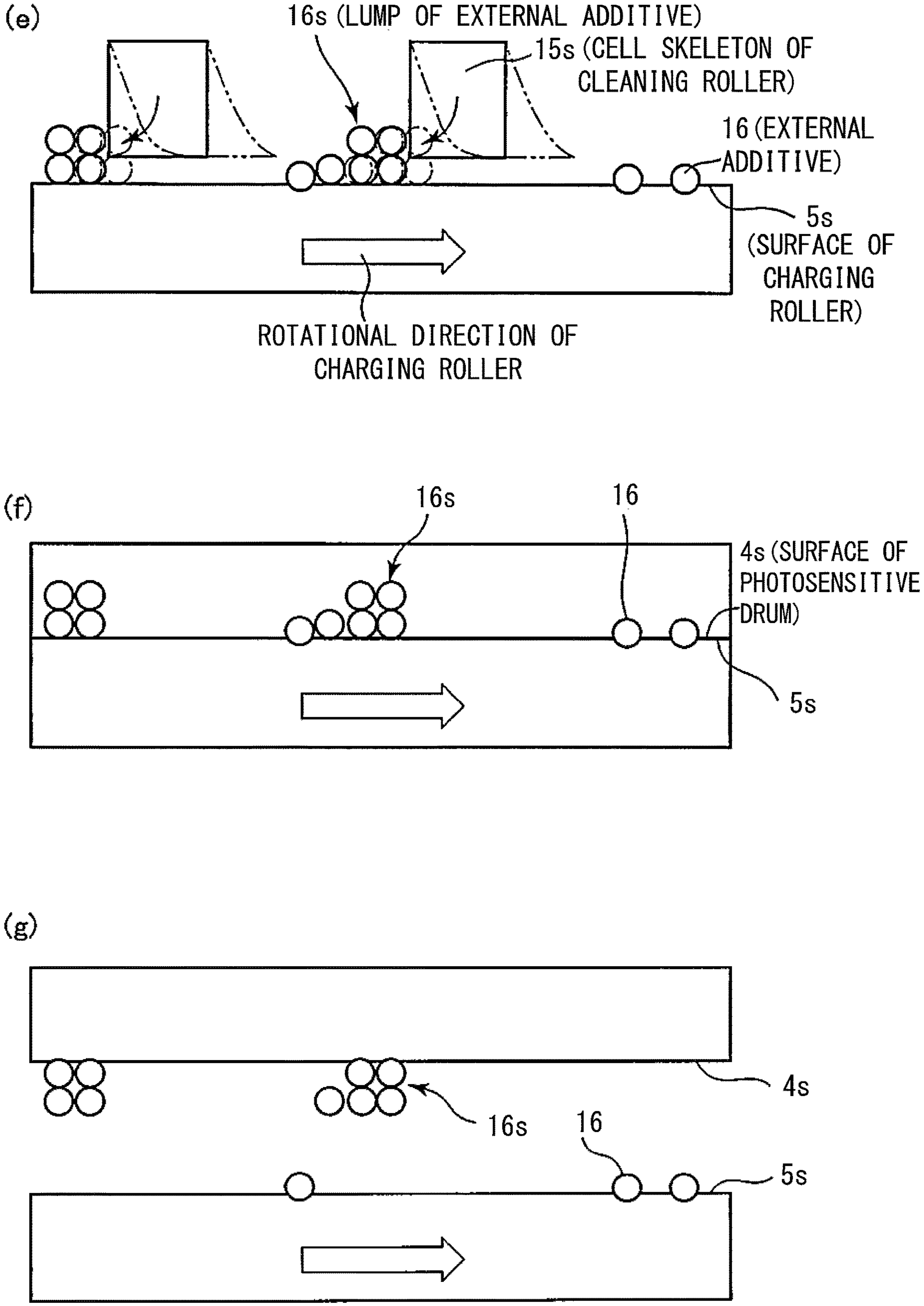
FIG. 6, part (e), part (f) and part (g), is a schematic view for describing the removing mechanism for the external additive according to the Example 1.

FIG. 5 and FIG. 6 are schematic views for describing the mechanism by which it becomes easier for the cleaning roller 15 to remove the external additives 16 of the surface 5$s$ of the charging roller 5 in the Example 1. Incidentally, FIG. 5 and FIG. 6 are schematically illustrating the cross-sectional views approximately perpendicular to the rotational axis direction of the charging roller 5 in the vicinity of the surface of the charging roller 5, and for the sake of illustrating the above mechanism, there is a case that the external additives adhered to the surface of the charging roller 5 and the surface of the photosensitive drum 4 may be illustrated inside of the surface.

The external additive 16 which has slipped through the cleaning blade 6 adheres electrostatically or non-electrostatically to the surface 5$s$ of the charging roller 5 at the contacting portion between the charging roller 5 and the photosensitive drum 4 (a state illustrated in part (a) of FIG. 5).

The external additive 16 adhered to the surface 5$s$ of the charging roller 5 is carried to the contacting portion Nc between the cleaning roller 15 (more specifically, the cell skeleton 15$s$ of the elastic foam layer 15$b$ made of urethane sponge) and the surface 5$s$ of the charging roller 5. In the contacting portion Nc between the surface 5$s$ of the charging roller 5 and the cleaning roller 15, the external additive 16 has the higher adhesive force to the cleaning roller 15 than to the charging roller 5. This is because, in the Example 1, the storage elastic modulus E'C of the surface of the charging roller 5 and the storage elastic modulus E'CC of the elastic foam layer of the cleaning roller 15 are in the relationship of E'C>E'CC. As a result, force in directions of arrows F in part (b) of FIG. 5 (direction from the charging roller 5 toward the cleaning roller 15) acts on the external additive 16. This is because of the characteristic that in the state in which the storage elastic modulus (E') is lower, the physical adhesive force becomes stronger, and in the state in which the storage elastic modulus (E') is higher, the physical adhesive force becomes weaker. In other words, when the charging roller 5 and the cleaning roller 15, which have different storage elastic modulus (E'), come into contact with the external additive 16, the cleaning roller 15, which has the lower storage elastic modulus (E'), has the higher adhesive force with the external additive 16. Therefore, the external additive 16 becomes more likely to move from the charging roller 5 to the cleaning roller 15 (a state illustrated in part (b) of FIG. 5).

The cleaning roller 15 is rotated with the rotation of the charging roller 5. Therefore, the cleaning roller 15 is rotated slightly behind the charging roller 5. As a result, the cell skeleton 15$s$ of the cleaning roller 15 is subjected to force which compresses the cell skeleton 15$s$ in a rotational direction of the charging roller 5 while relatively moving to an opposite direction to the rotational direction of the charging roller 5 (a state illustrated in part (c) of FIG. 5).

As the charging roller 5 rotates further, the cleaning roller 15 also is rotated while slightly behind as described above. At this time, the external additive 16 is only lightly adhered to the surface 5$s$ of the charging roller 5 and is easily moved by the contact of the cell skeleton 15$s$ of the cleaning roller 15. As a result, the external additives 16 adhered to the surface 5$s$ of the charging roller 5 are moved so as to be gathered by the cell skeleton 15$s$ of the cleaning roller 15, and the lumps 16$s$ of the external additives 16 are formed (a state illustrated in part (d) of FIG. 5).

Next, a moment when the surface 5$s$ of the charging roller 5 exits the contacting portion Nc with the cleaning roller 15 arrives. At the moment when the surface layer 5$s$ of the charging roller 5 is separated from the cleaning roller 15, the force in the compressing direction accumulated so far in the cell skeleton 15$s$ of the cleaning roller 15 is released at once. At this time, the cell skeleton 15$s$ of the cleaning roller 15 vigorously flicks the lumps 16$s$ of the external additives 16 which have been formed on the surface 5$s$ of the charging roller 5, and lifts the lumps 16$s$ off the surface of the charging roller 5 (a state illustrated in part (e) of FIG. 6).

After that, the lumps 16$s$ of the external additives 16 on the charging roller 5 are carried to the contacting portion between the charging roller 5 and the photosensitive drum 4 while remaining adhered to the surface of the charging roller 5 (a state illustrated in part (f) of FIG. 6).

And the clumps of external additives 16 on the charging roller 5 then move from the surface 5$s$ of the charging roller 5 to the surface 4$s$ of the photosensitive drum 4 and adhere thereto (a state illustrated in part (g) of FIG. 6).

The external additives 16 adhered to the surface 4$s$ of the photosensitive drum 4 are then collected by the developing sleeve 7 in the developing portion to the developing device 2, transferred onto the recording material P in the transfer portion, or collected by the cleaning blade 6 to the cleaning device 17.

As described above, in the Example 1, the storage elastic modulus E'C of the surface of the charging roller 5 and the storage elastic modulus E'CC of the elastic foam layer of the cleaning roller 15 are in the relationship of E'C>E'CC. As a result, the external additive 16 adhered to the surface 5$s$ of the charging roller 5 has the higher adhesion force to the cleaning roller 15 than to the charging roller 5. Therefore, the external additive 16 adhered to the surface 5$s$ of the charging roller 5 is easily moved by the cell skeleton 15$s$ of the cleaning roller 15. In other words, in the Example 1, the cleaning roller 15 has a function to collect the external additive 16 adhered to the surface 5$s$ of the charging roller 5 in the lump-shape and simply move, without rubbing, the external additive 16. By this function, the external additive 16 can be lifted off of the surface 5$s$ of the charging roller 5, and by returning the external additive 16 to the photosensitive drum 4, a function of cleaning the external additive 16 on the surface 5$s$ of the charging roller 5 is realized. In other words, the cleaning roller 15 does not scrape the external additive 16, but rather lifts the external additive 16 off the surface 5$s$ of the charging roller 5 and returns the external additive 16 to the photosensitive drum 4 when the cleaning roller 15 is in contact with and is separated from the charging roller 5. Therefore, the external additives are unlikely to accumulate on the surface of the charging roller 5 as well as on the cleaning roller 15. Therefore, it becomes possible to maintain the removing effect of the external additives from the charging roller 5 by the cleaning roller 15 for a longer period of time and suppress the contamination of the charging roller 5 for a longer period of time. As a result, it becomes advantageous to extend the service life of the process cartridge C.

Figure 7:
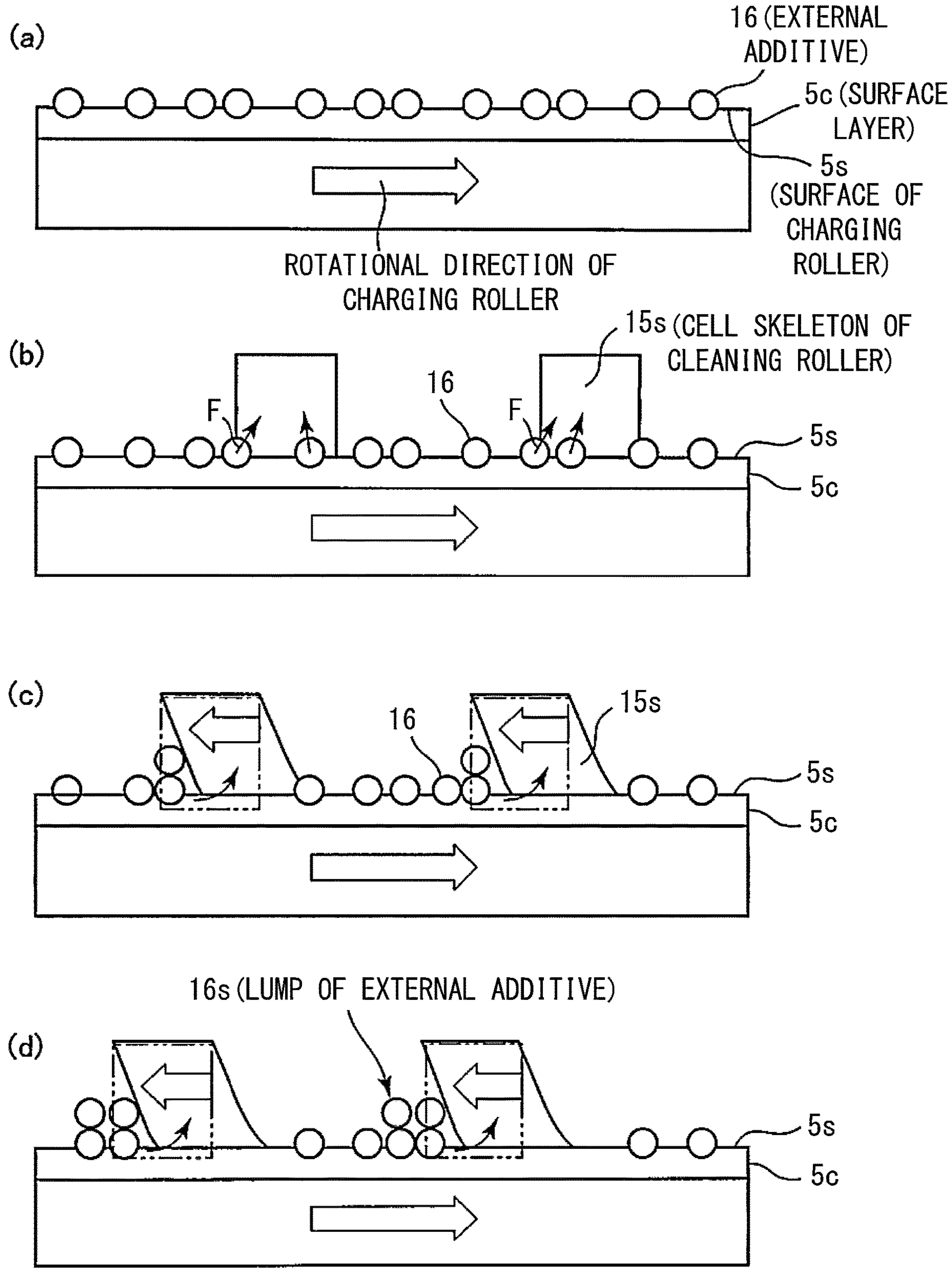
FIG. 7, part (a), part (b), part (c) and part (d), is a schematic view for describing a removing mechanism for the external additive according to an Embodiment 2.
Figure 8:
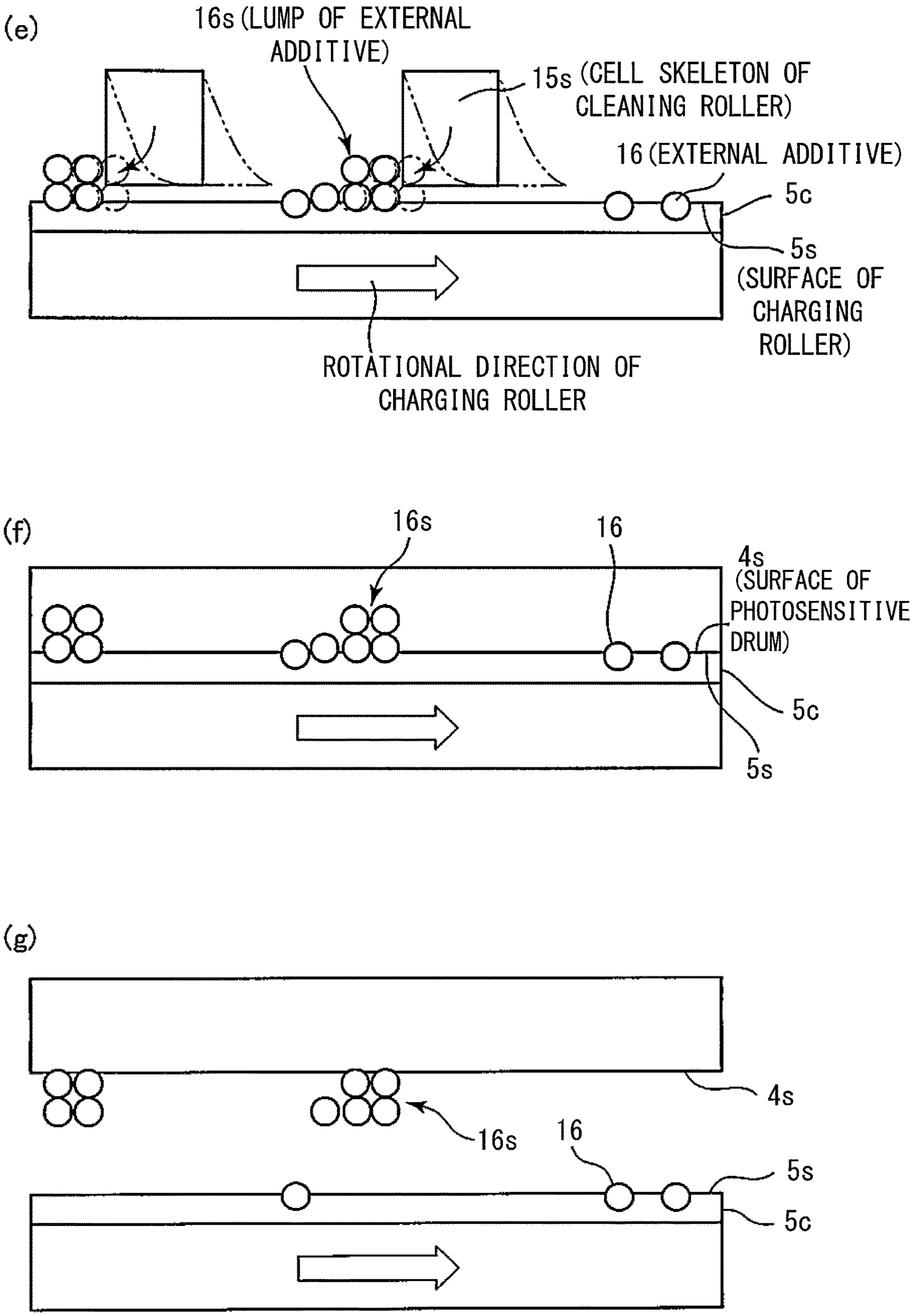
FIG. 8, part (e), part (f) and part (g), is a schematic view for describing the removing mechanism for the external additive according to the Embodiment 2.

FIG. 7 and FIG. 8 are schematic views for describing the mechanism by which it becomes easier for the cleaning roller 15 to remove the external additives 16 of the surface 5*s* of the charging roller 5 in the Example 2. The mechanism in the Example 2, illustrated in FIG. 7 and FIG. 8, is the same as the mechanism in the Example 1, illustrated in FIG. 5 and FIG. 6. In other words, in the Example 2, the external additives 16 of the surface of the charging roller 5 are removed through states illustrated in part (a) through part (d) of FIG. 7 and part (e) through part (g) of FIG. 8, which are the same states as the states illustrated in part (a) through part (d) of FIG. 5 and part (e) through part (g) of FIG. 6 in the Example 1. However, in the Example 2, as shown in FIG. 7 and FIG. 8, to the charging roller 5, the surface layer 5*c* is provided on the elastic layer 5*b*, and this surface layer 5*c* forms the surface 5*s* of the charging roller 5.

Here, in the Example 2, as in the Example 1, the storage elastic modulus E'C of the surface of the charging roller 5 and the storage elastic modulus E'CC of the elastic foam layer of the cleaning roller 15 are in the relationship of E'C>E'CC. However, in the Example 2, difference between E'C and E'CC is larger than in the Example 1. In addition, in the Example 2, the Martens hardness is configured to be 25 N/mm$^2$. In the Example 2, this configuration is accomplished by providing the surface layer 5*c* outside the elastic layer 5*b* of the charging roller 5.

In the Example 2, by the difference between the E'C and the E'CC being larger than in the Example 1, the action to form the lump 16*s* of the external additives 16 on the surface 5*s* of charging roller 5 and the action to vigorously flick and lift this lump works more than in the Example 1. In addition, in the Example 2, by the Martens hardness being 25 N/mm$^2$, which is greater than that of the Example 1, the action to vigorously flick and lift the lump 16*s* of the external additive 16 formed on the surface 5*s* of the charging roller 5 works more effectively. From the results from the Examples 1 through 4, it can be seen that this action works more effectively when the Martens hardness is 15 N/mm$^2$ or more. By this, it becomes possible to remove the external additives 16 more effectively in the Example 2 (and in the Example 3) than in the Example 1.

From the results of the Example 1 and 2, it can be seen that when the difference between the E'C and the E'CC is about 10 MPa, or in other words, even in a case in which the E'C is twice as large as the E'CC, the effect of the present Embodiment described above can be obtained. According to further examination by the present inventors, it is found that the difference between the E'C and the E'CC is preferably 1 MPa or more, and more preferably 10 MPa or more, and further preferably 100 MPa or more in order to obtain more pronounced effect of the present Embodiment described above. In other words, the E'C is preferably twice or more than the E'CC, is more preferably 10 times or more, and is further preferably 100 times or more.

However, the storage elastic modulus E'C of the surface of charging roller 5 is preferably 5 MPa or more and 3000 MPa or less. In other words, if the storage elastic modulus E'C is larger than the range, there is a possibility that it becomes more likely for a vertical streak image to occur by the charging roller 5 being contaminated by the toner squashed by the charging roller 5. In addition, if the storage elastic modulus E'C is smaller than the range, there is a possibility that it becomes more likely for adhesion of the toner to the surface of the charging roller 5 to occur by tackiness of the surface of the charging roller 5 becoming stronger. From this perspective, the E'C is preferably 5 MPa or more and 3000 MPa or less, and is more preferably 10 MPa or more and 2000 MPa or less.

In addition, the storage elastic modulus E'CC of the elastic foam layer of the cleaning roller 15 is preferably 1 MPa or more and 500 MPa or less. In other words, if the storage elastic modulus E'CC is larger than this range, the cleaning roller 15 is harden and may not be able to follow the rotation of the charging roller 5. In addition, if the storage elastic modulus E'CC is smaller than this range, it may become easier for the toner T and the external additive 16 to adhere to the cleaning roller 15. From this perspective, the E'CC is preferably 1 MPa or more and 500 MPa less, and is more preferably 5 MPa or more and 100 MPa or less.

Thus, in the present Embodiment, the image forming apparatus 100 comprises the rotatable image bearing member (photosensitive drum) 4, the charging roller 5 provided with the surface 5*s* contacting the surface of the image bearing member 4 and configured to be rotated in contact with the rotating image bearing member 4 and to charge the surface 4*s* of the image bearing member 4, the cleaning roller 15 provided with the elastic foam layer 15*b* contacting the surface 5*s* of the charging roller 5 and configured to be rotated in contact with the rotating charging roller 5 and clean the surface 5*s* of the charging roller 5, and the developing means (developing device) 2 configured to supply the developer to the surface 4*s* of the image bearing member 4 and form the developer image thereon, and the storage elastic modulus of the surface 5*s* of the charging roller 5 measured in the measuring environment of 23° C., 50% RH and the measuring frequency 10 Hz is defined as E'C and the storage elastic modulus of the elastic foam layer 15*b* of the cleaning roller 15 is defined as E'CC measured in the measuring environment and the measuring frequency, and the storage elastic modulus E'C of the surface 5*s* of the charging roller 5 and the storage elastic modulus E'CC of the elastic foam layer 15*b* of the cleaning roller 15 satisfy the following relationship E'C>E'CC. The charging roller 5 may be configured to include the elastic layer 5*b* forming the surface 5*s* of the charging roller 5.

In addition, the charging roller 5 may also be configured to include the elastic layer 5*b* and the surface layer 5*c* forming the surface 5*s* of the charging roller 5. In addition, the Martens hardness of the surface 5*s* of the charging roller 5 is preferably 15 N/mm$^2$ to 40 N/mm$^2$. In addition, in the present Embodiment, the cleaning roller 15 is rotated with the rotation of the charging roller 5. In addition, in the present Embodiment, the elastic layer 5*b* of the charging roller 5 includes the matrix containing the first rubber and a plurality of the domains dispersed in the matrix, the domains containing the second rubber and the electroconductive agent. Here, the volume resistivity of the matrix is preferably more than $1.0\times10^{8}$ Ω·cm and equal to or less than $1.0\times10^{17}$ Ω·cm. In addition, the volume resistivity of the domains is preferably $1.0\times10^{1}$ Ω·cm to $1.0\times10^{4}$ Ω·cm. In addition, in the present Embodiment, the process cartridge C mountable to and demountable from the main assembly 110 of the image forming apparatus 100 for forming the developer image by supplying the developer to the surface 4*s* of the rotatable image bearing member 4 by the developing means 2 and forming the image on the recording material P by transferring the developer image onto the recording material P is provided. And the process cartridge C is configured to include the image bearing member 4, the charging roller 5 and the cleaning roller 15, and is configured so that, in the measuring environment of 23° C., 50% RH and the measuring frequency of 10 Hz, the storage elastic modulus E'C of the surface 5*s* of the charging roller 5 and the storage elastic modulus E'CC of the cleaning roller 15 satisfy the relationship of E'C>E'CC.

As described above, according to the present Embodiment, it becomes possible to remove the toner and the external additives adhered to the charging roller 5 more effectively by the cleaning roller 15. By this, it becomes possible to maintain the removing effect of the toner and the external additives from the charging roller 5 by the cleaning roller 15 for a longer period of time and suppresses the contamination of the charging roller 5 for a longer period of time. As a result, it becomes advantageous to extend the service life of the process cartridge C.

As described above, the present invention has been described according to the specific embodiments, however, the present invention is not limited to the above embodiments.

An image forming apparatus to which the present invention can be applied is not limited to the image forming apparatus having the basic configuration described in the present Embodiment above. For example, the present invention can be applied to an image forming apparatus which has a plurality of process cartridges mountable thereto and demountable therefrom, and is capable of forming a full-color image, etc. by transferring multicolor toner images to a recording material using an intermediary transfer member such as an intermediary transfer belt. In addition, in the Embodiment described above, the image forming apparatus is configured so that the process cartridge is mountable thereto and demountable therefrom. However, the present invention is not limited to such a mode, but can be applied to an image forming apparatus in which a process unit which is similar to what constitutes the process cartridge in the present Embodiment described above is provided in the main assembly. In addition, for example, the drum unit in the present Embodiment described above is configured to be mountable to and demountable from the main assembly substantially independently. It is suffice for the process cartridge to include the photosensitive member, the charging roller and the cleaning roller. Incidentally, as examples of the image forming apparatus, a copy machine, a printer (laser beam printer, LED printer, etc.), a facsimile machine, a word processor, a multifunction machines thereof (multifunction printer), etc. are included.

In addition, in the Embodiments described above, the developing device is what uses a non-contact developing type in which the image bearing member and the developer bearing member are disposed opposite with a predetermined gap, however, it is not limited thereto. The developing device may be a two-component developing type which uses a two-component developer, or a contact developing type in which the image bearing member and the developer bearing member are disposed in contact with each other. In other words, the developer is not limited to the magnetic one-component developer in the Embodiment described above, but may be a two-component developer or a non-magnetic one-component developer.

In addition, as in the Embodiments described above, with the configuration in which the cleaning roller is rotated by the rotation of the charging roller, with a simple configuration, difference in peripheral speed can be realized so that the cleaning roller is rotated slightly behind the rotation of the charging roller without requiring any special configuration or control. Incidentally, in the Embodiments described above, the charging roller is also configured to be rotated by the rotation of the photosensitive drum. However, at least one of the charging roller and the cleaning roller may be configured to be rotationally driven. As mentioned above, for example, in a configuration in which the charging roller and the cleaning roller are rotationally driven, respectively, even when both peripheral speeds are aimed to be the same speed, it is generally difficult to make the speeds completely the same speed, and a slight difference in the peripheral speed (e.g., about ±5%) occurs. Therefore, even with such a configuration, the removing effect of the toner and the external additives on the charging roller by the cleaning roller can be achieved as described in the above Embodiments. At least one of the charging roller and the cleaning roller may be configured to be rotationally driven so that there is a predetermined difference in the peripheral speed (e.g., about ±5%) in advance. In addition, in this case, it may also be a configuration in which the peripheral speed of the cleaning roller is faster than that of the charging roller, and in such a case as well, the action to gather the external additives and the action to flick and lift the external additives, corresponding to that in the above Embodiments, can be obtained.

In addition, the present invention is also applicable to an image forming apparatus (process cartridge) with a so-called cleaner-less configuration, which does not include a specific cleaning device to clean an image bearing member but collects the toner such as the transfer residual toner in a developing device.

According to the present invention, it becomes possible to remove the toner and the external additives adhered to the charging roller by the cleaning roller more effectively.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-101284, filed Jun. 20, 2023, which is hereby incorporated by reference herein in its entirety.

What is claimed is:

1. An image forming apparatus, comprising:

a rotatable image bearing member;

a charging roller having a surface that contacts a surface of the image bearing member, and that is configured to be rotated in contact with the rotating image bearing member and to charge the surface of the image bearing member;

a cleaning roller having an elastic foam layer that contacts the surface of the charging roller and that is configured to be rotated in contact with the rotating charging roller and to clean the surface of the charging roller; and a developing member that is configured to supply a developer to the surface of the image bearing member and to form a developer image thereon, wherein E'C>E'CC when E'C is a storage elastic modulus measured within a depth of 10 μm from the surface of the charging roller in a measuring environment of 23° C., 50% RH and a measuring frequency of 10 Hz and E'CC is a storage elastic modulus of the elastic foam layer of the cleaning roller measured in the measuring environment at the measuring frequency, and a Martens hardness of the surface of the charging roller is 15 to 40 $N/mm^2$ when it reaches a pushing depth of 0.1 μm.

2. The image forming apparatus according to claim 1, wherein the charging roller includes an elastic layer forming the surface of the charging roller.

3. The image forming apparatus according to claim 2, wherein the elastic layer of the charging roller includes a matrix containing a first rubber and a plurality of domains dispersed in the matrix, the domains containing a second rubber and an electroconductive agent.

4. The image forming apparatus according to claim 3, wherein the matrix has a volume resistivity of more than $1.0\times10^8$ to equal or less than $1.0\times10^{17}$ Ω·cm.

5. The image forming apparatus according to claim 3, wherein the domains have a volume resistivity of $1.0\times10^1$ to $1.0\times10^4$ Ω·cm.

6. The image forming apparatus according to claim 1, wherein the charging roller includes an elastic layer and a surface layer forming the surface of the charging roller.

7. The image forming apparatus according to claim 1, wherein the cleaning roller is rotated with rotation of the charging roller.

8. The image forming apparatus according to claim 1, wherein the storage elastic modulus is a value indicating a capability to hold a stress stored inside a rubber or a resin.

9. The image forming apparatus according to claim 1, wherein an adhesive force of an external additive externally added to the developer to the cleaning roller is larger than an adhesive force of the external additive to the charging roller.

10. A process cartridge mountable to and demountable from a main assembly of an image forming apparatus that is configured to form a developer image by supplying a developer to a surface of a rotatable image bearing member and form an image on a recording material by transferring the developer image onto the recording material, the process cartridge comprising:

the rotatable image bearing member;

a charging roller having a surface that contacts a surface of the image bearing member, and that is configured to be rotated in contact with the rotating image bearing member and to charge the surface of the image bearing member;

a cleaning roller having an elastic foam layer that contacts the surface of the charging roller and that is configured to be rotated in contact with the rotating charging roller and to clean the surface of the charging roller; and a developing member that is configured to supply a developer to the surface of the image bearing member and to form a developer image thereon, wherein E'C>E'CC when E'C is a storage elastic modulus measured within a depth of 10 μm from the surface of the charging roller in a measuring environment of 23° C., 50% RH and a measuring frequency of 10 Hz and E'CC is a storage elastic modulus of the elastic foam layer of the cleaning roller measured in the measuring environment at the measuring frequency, and a Martens hardness of the surface of the charging roller is 15 to 40 $N/mm^2$ when it reaches a pushing depth of 0.1 μm.

11. The process cartridge according to claim 10, wherein the charging roller includes an elastic layer forming the surface of the charging roller.

12. The process cartridge according to claim 11, wherein the elastic layer includes a matrix containing a first rubber and a plurality of domains dispersed in the matrix, the domains containing a second rubber and an electroconductive agent.

13. The image forming apparatus according to claim 12, wherein the matrix has a volume resistivity of more than $1.0\times10^8$ to equal or less than $1.0\times10^{17}$ Ω·cm.

14. The image forming apparatus according to claim 12, wherein the domains have a volume resistivity of $1.0\times10^1$ to $1.0\times10^4$ Ω·cm.

15. The process cartridge according to claim 10, wherein the charging roller includes an elastic layer and a surface layer forming the surface of the charging roller.

16. The process cartridge according to claim 10, wherein the cleaning roller is rotated with rotation of the charging roller.

17. The process cartridge according to claim 10, wherein the storage elastic modulus is a value indicating a capability to hold a stress stored inside a rubber or a resin.

18. The process cartridge according to claim 10, wherein an adhesive force of an external additive externally added to the developer to the cleaning roller is larger than an adhesive force of the external additive to the charging roller.

* * * * *